(12) United States Patent
Cleary et al.

(10) Patent No.: US 9,970,493 B2
(45) Date of Patent: May 15, 2018

(54) DISC BRAKE

(71) Applicant: MERITOR HEAVY VEHICLE BRAKING SYSTEMS (UK) LIMITED, Cwmbran Gwent (GB)

(72) Inventors: Sean Cleary, Cwmbran Gwent (GB); Dietmar Knoop, Cwmbran Gwent (GB); Refaat Malki, Cwmbran Gwent (GB); Mark Norman, Cwmbran Gwen (GB); Paul Roberts, Cwmbran Gwent (GB); Paul Thomas, Cwmbran Gwent (GB); Neil Williams, Cwmbran Gwent (GB)

(73) Assignee: Meritor Heavy Vehicle Braking Systems (UK) Limited, Cwmbran, Gwent (GB)

( * ) Notice: Subject to any disclaimer, the term of this patent is extended or adjusted under 35 U.S.C. 154(b) by 0 days. days.

(21) Appl. No.: 15/007,982

(22) Filed: Jan. 27, 2016

(65) Prior Publication Data

US 2016/0215835 A1 Jul. 28, 2016

(30) Foreign Application Priority Data

Jan. 28, 2015 (EP) .................................... 15152951

(51) Int. Cl.
*F16D 65/14* (2006.01)
*F16D 65/00* (2006.01)
(Continued)

(52) U.S. Cl.
CPC ....... *F16D 65/0068* (2013.01); *F16D 55/226* (2013.01); *F16D 55/2265* (2013.01);
(Continued)

(58) Field of Classification Search
CPC .. F16D 65/0068; F16D 65/0087; F16D 65/52; F16D 65/567; F16D 66/02;
(Continued)

(56) References Cited

U.S. PATENT DOCUMENTS 3,851,567 A * 12/1974 Thompson .............. B60T 11/16
188/370
6,651,784 B1 * 11/2003 Barbosa .................. F16D 65/18
188/71.9
(Continued)

FOREIGN PATENT DOCUMENTS

CN 1697942 A 11/2005
CN 1786506 A 6/2006
(Continued)

OTHER PUBLICATIONS

European Patent Office, Extended Search Report for the corresponding European Patent Application No. 15152951.8 dated Jul. 14, 2015.
(Continued)

*Primary Examiner* — Christopher P Schwartz
(74) *Attorney, Agent, or Firm* — Brooks Kushman P.C.

(57) ABSTRACT

A disc brake having a caliper, a housing bore, a guide insert, and a piston. The housing bore extends inboard from an outboard face of a housing portion of the caliper. The guide insert may have an inner guide bore and may be mounted within the housing bore. The piston may be slideable within the inner guide bore relative to the guide insert so as to urge a brake pad towards a rotor.

13 Claims, 21 Drawing Sheets

(51) Int. Cl.
*F16D 55/2265* (2006.01)
*F16D 55/226* (2006.01)
*F16D 65/18* (2006.01)
F16D 55/00 (2006.01)
F16D 121/14 (2012.01)
F16D 125/04 (2012.01)
F16D 125/06 (2012.01)
F16D 125/26 (2012.01)
F16D 125/32 (2012.01)

(52) U.S. Cl.
CPC ......... *F16D 65/0087* (2013.01); *F16D 65/18* (2013.01); *F16D 65/183* (2013.01); F16D 2055/002 (2013.01); F16D 2055/0016 (2013.01); F16D 2121/14 (2013.01); F16D 2125/04 (2013.01); F16D 2125/06 (2013.01); F16D 2125/26 (2013.01); F16D 2125/32 (2013.01)

(58) Field of Classification Search
CPC .. F16D 55/2265; F16D 55/225; F16D 55/226; F16D 55/25; F16D 55/26
USPC ................... 188/71.7–71.9, 72.4, 72.7–72.9
See application file for complete search history.

(56) References Cited

U.S. PATENT DOCUMENTS

| 7,490,703 B2* | 2/2009 | Maehara | F16D 65/18 188/71.9 |
| 2002/0112927 A1* | 8/2002 | Giering | F16D 65/183 188/1.11 W |
| 2011/0017553 A1* | 1/2011 | Maehara | F16D 65/183 188/71.9 |
| 2016/0215834 A1* | 7/2016 | Knoop | F16D 55/226 |
| 2016/0215835 A1* | 7/2016 | Cleary | F16D 55/226 |
| 2016/0215836 A1* | 7/2016 | Knoop | F16D 55/226 |
| 2016/0215837 A1* | 7/2016 | Cleary | F16D 55/226 |
| 2016/0215841 A1* | 7/2016 | Cleary | F16D 65/18 |

FOREIGN PATENT DOCUMENTS

| EP | 1852627 B1 | 3/2011 |
| IT | BG2008A000064 A1 | 6/2010 |
| WO | 9322579 A1 | 5/1993 |
| WO | 0730107 A2 | 9/1996 |
| WO | 9722814 A1 | 6/1997 |
| WO | 03081071 A1 | 10/2003 |
| WO | 2004074705 A1 | 9/2004 |

OTHER PUBLICATIONS

The State Intellectual Property Office of China, Chinese Office Action for the corresponding Chinese Patent Application No. 201610059398.5 dated Nov. 16, 2017.

* cited by examiner

DISC BRAKE

TECHNICAL FIELD

The present invention relates to a disc brake. More particularly, the present invention relates to a single piston disc brake arrangement having no requirement for a separate cover plate.

BACKGROUND

Braking systems of heavy trucks generally use air under pressure as the operating medium. Typically, large air actuators have a mechanical output which applies brake pads to the brake rotor via a lever mechanism. The lever mechanism includes an operating shaft pivotable about two bearing surfaces on a common axis to urge one or more pistons against a brake pad via a cam surface. The shaft has a lever arm acted upon by the air actuator, and may include another generally shorter arm to actuate a wear adjuster mechanism. For larger brake pads, twin pistons are provided to optimize pressure distribution on the brake pad backplate. A known braking mechanism of this type is shown in document WO2004/074705 (Knorr-Bremse).

For lighter duty applications (e.g., lighter trucks or trailers of tractor-trailer units) with smaller brake pads a single piston is sufficient, but nevertheless two bearings are provided. This arrangement adds to the cost and weight of the brake, complexity of machining the bearing surfaces, and also results in problems in packaging the components within the smaller brake envelope, because space at the inboard (with respect to the vehicle on which the brake is fitted) side of the brake rotor is limited. An example of a brake of this type is EP0730107 (Perrot Bremsen).

The present applicant in EP1852627 B1 proposed a solution to this problem. However, the actuation mechanism disclosed therein retains a relatively complex wear adjuster mechanism, cover plate, carrier and pad construction.

With reference to the prior art, most air actuated disc brake units currently have a requirement for a separate cover plate facing the rotor to enable the actuation and adjustment mechanisms to be assembled therein. Locating the cover plate requires the drilling and tapping of separate holes in the caliper housing. More machining is required to manufacture the unit to allow for this and a relatively large housing is needed. Hence, the brake unit may be heavier and expensive to produce. In most applications such an arrangement is entirely satisfactory. However, the inventors have recognized that providing a brake without the requirement for a separate cover plate may result in a less costly, lighter, smaller/more compact unit.

In other prior art documents the caliper housing is formed from two cast parts, the internals of the caliper are assembled to one of the parts, and the two parts then bolted together. However, the bolted connection is an area of possible weakness that requires sealing to prevent ingress of contaminants.

The present invention seeks to overcome or at least mitigate the problems associated with the prior art.

SUMMARY

A first aspect of the invention provides a disc brake that may include a caliper having a bridge portion arranged to extend over a rotor and a housing portion inboard of the bridge portion and rotor; a housing bore extending inboard from an outboard face of the housing portion; a separate guide insert having an inner guide bore and being mounted within the housing bore such that an inner surface of the housing bore limits transverse movement of the guide insert; and a piston slideable within the inner guide bore, relative to the guide insert, so as to urge a brake pad towards the rotor and apply the brake, wherein the inner guide bore is dimensioned relative to the piston to restrain movement of the piston transverse to the longitudinal axis of the piston.

Using a separate guide insert simplifies manufacturing of the disc brake as no complex cover plate is necessary, contrary to the prior art.

The housing bore may be substantially cylindrical.

As the bore is a simple shape, it is may be easier and lower cost to manufacture.

The guide insert may be substantially cylindrical.

The guide insert may have a radially extending external lip configured to engage the outboard face of the caliper adjacent the housing bore, to limit axial movement of the guide insert inboard.

The disc brake may further comprise a retaining insert configured to engage the guide insert, to retain the guide insert within the housing bore in at least one axial direction.

The retaining insert may be adjacent the outboard opening of the housing bore and project from the outboard face of the housing, wherein at least a portion of the retaining insert is deformable over the guide insert in order to retain the guide insert within the housing bore.

As well as helping to form a seal between the guide insert and the bore, the use of a retaining insert with a deformable portion enables easy assembly of the other components of the brake, as the fit between the guide insert and the bore can be relatively loose, so the parts can be aligned in the correct location before they are secured in place.

The deformable portion of the retaining insert may extend around the entire circumference of the guide insert.

The retaining insert may be metallic.

The use of a metallic retaining insert enables the caliper to be cast around the retaining insert during manufacture, to secure the retaining insert in the correct location.

The guide insert may be retained within the housing bore by using a removable fastener to mount the guide insert within the housing bore.

The guide insert may have a first circumferential recess in an external surface, the inner surface of the housing bore may have a corresponding second circumferential recess, and the removable fastener may be a circlip, snap ring or canted clip that engages the first and second recesses.

The guide insert may further comprise a circumferential recess for accommodating a seal element.

The guide insert may be tapered, to help retain the guide insert within the housing bore.

The guide insert may be retained within the housing bore by way of an interference fit between the guide insert and the housing bore.

The outer surface of the guide insert and the inner surface of the housing bore may have corresponding engaging threads to retain the guide insert within the housing bore.

The disc brake may further comprise a sealing element mounted proximate the outboard opening of the housing bore.

The disc brake may further comprise an operating shaft mounted in the housing inboard of the piston, the operating shaft being dimensioned so as to fit through the housing bore.

The guide insert may have an annular recess in an inboard face for accommodating at least part of an adjustment mechanism of a brake.

The brake may be a single piston disc brake.

The bridge and housing may be a single monolithic component, e.g., a casting.

A second aspect of the invention provides a method of assembling a disc brake. The method may include manufacturing a caliper having a bridge portion for extending over a rotor and a housing portion inboard of the bridge portion and rotor, wherein the caliper comprises a housing bore extending inboard from an outboard face of the housing portion; providing a guide insert having an inner guide bore; inserting a piston within the inner guide bore, the piston slidable within the inner guide bore, relative to the guide insert, so as to urge a brake pad towards the rotor and apply the brake; mounting the guide insert and the piston within the housing bore such that an inner surface of the housing bore limits transverse movement of the guide insert in a desired final position; and securing the guide insert in the desired final position.

The method may comprise providing a deformable retaining insert on the caliper adjacent the opening of the housing bore, so that the retaining insert projects from the outboard face of the caliper, and deforming the retaining insert to retain the guide insert.

The retaining insert may be metallic, and mounting the retaining insert to the caliper comprises casting the caliper around the metal insert.

A third aspect of the invention provides a method of reassembling the brake of any of the first aspect of the invention, wherein the brake comprises a deformed retaining insert and is arranged to accept a snap ring, circlip and/or canted clip. The method may include removing the deformed portion of the metal retaining insert, so the guide insert is no longer retained; removing the guide insert from the caliper; inserting a snap ring, circlip and/or canted clip in a circumferential recess of the same or a different guide insert; and mounting the guide insert within the caliper.

BRIEF DESCRIPTION OF THE DRAWINGS

Embodiments of the present invention will now be described, by way of example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Actuation

Figure 1:
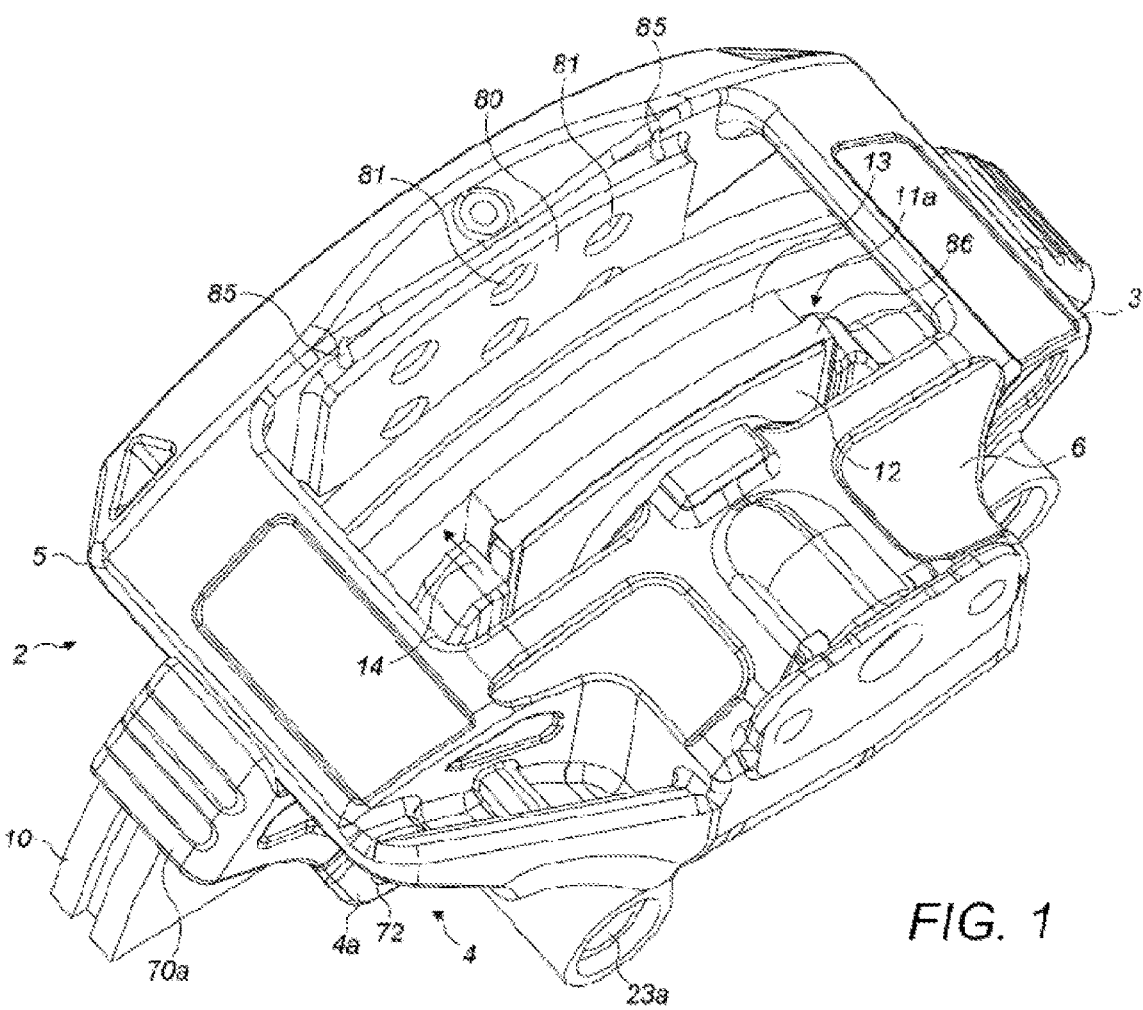
FIG. 1 is an isometric view of a brake according to an embodiment of the present invention.
Figure 2:
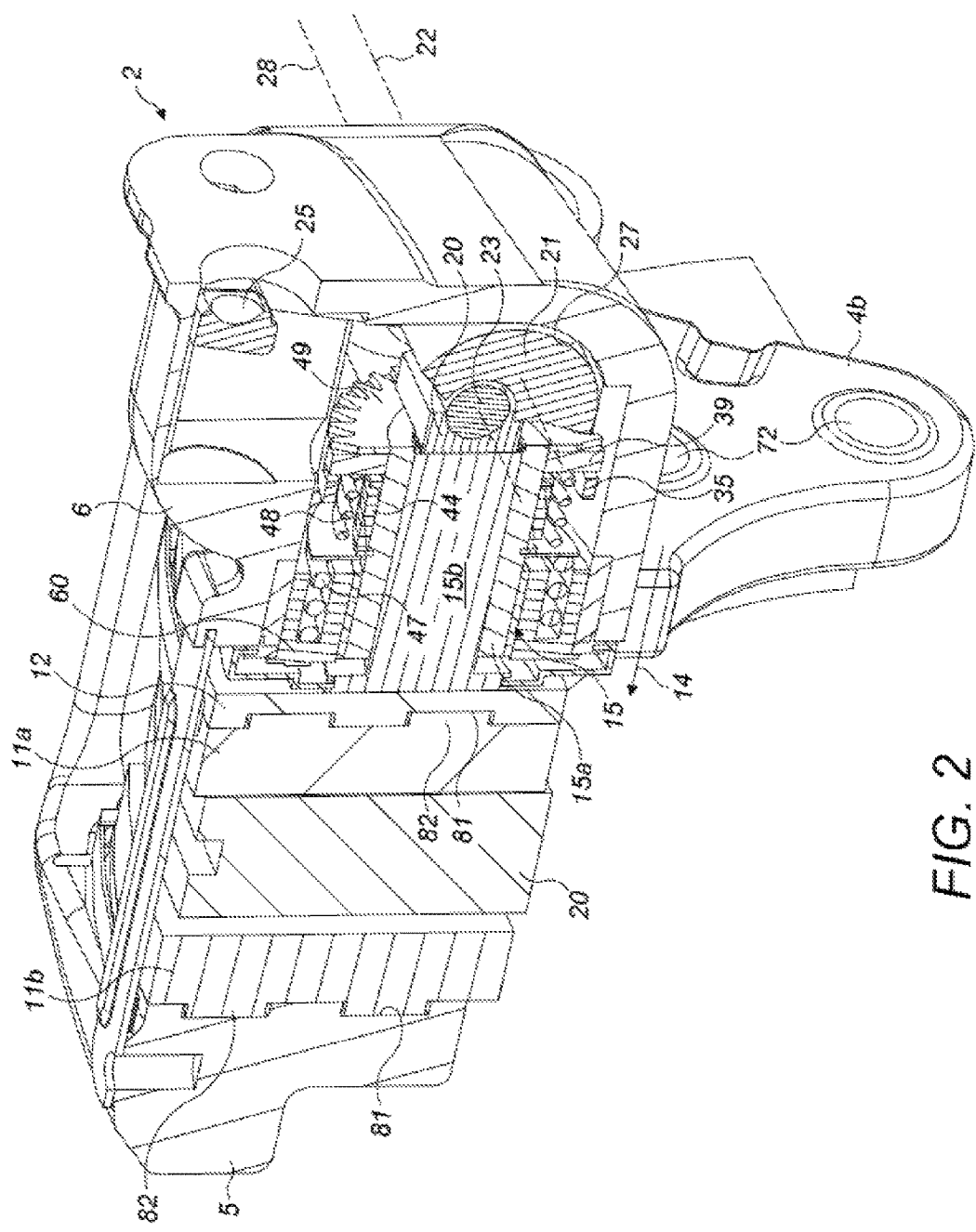
FIG. 2 is an isometric side cross-sectional view of the brake of FIG. 1 on a radial inboard-outboard plane.
Figure 3:
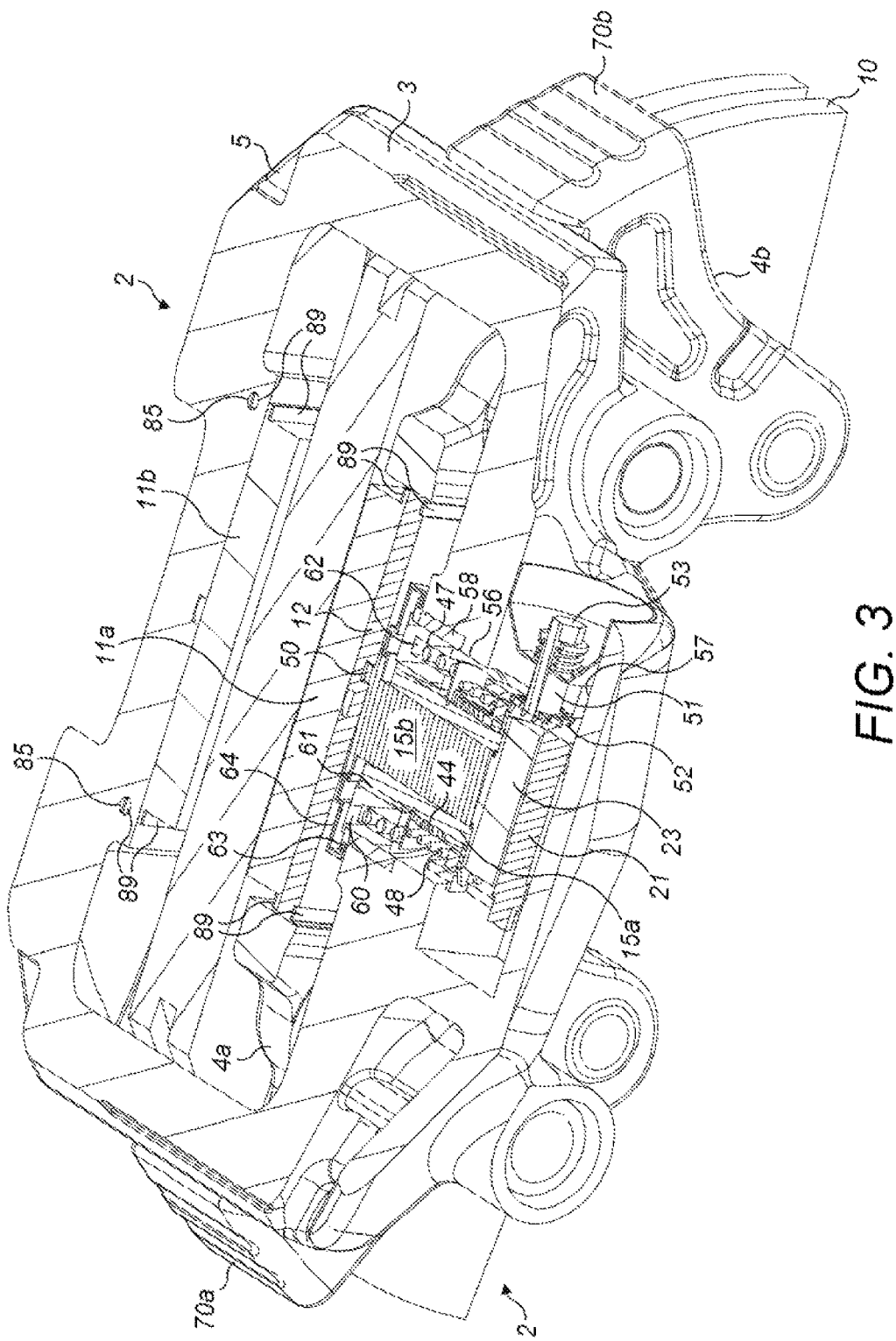
FIG. 3 is an isometric plan cross-sectional view of the brake of FIG. 1.
Figure 4:
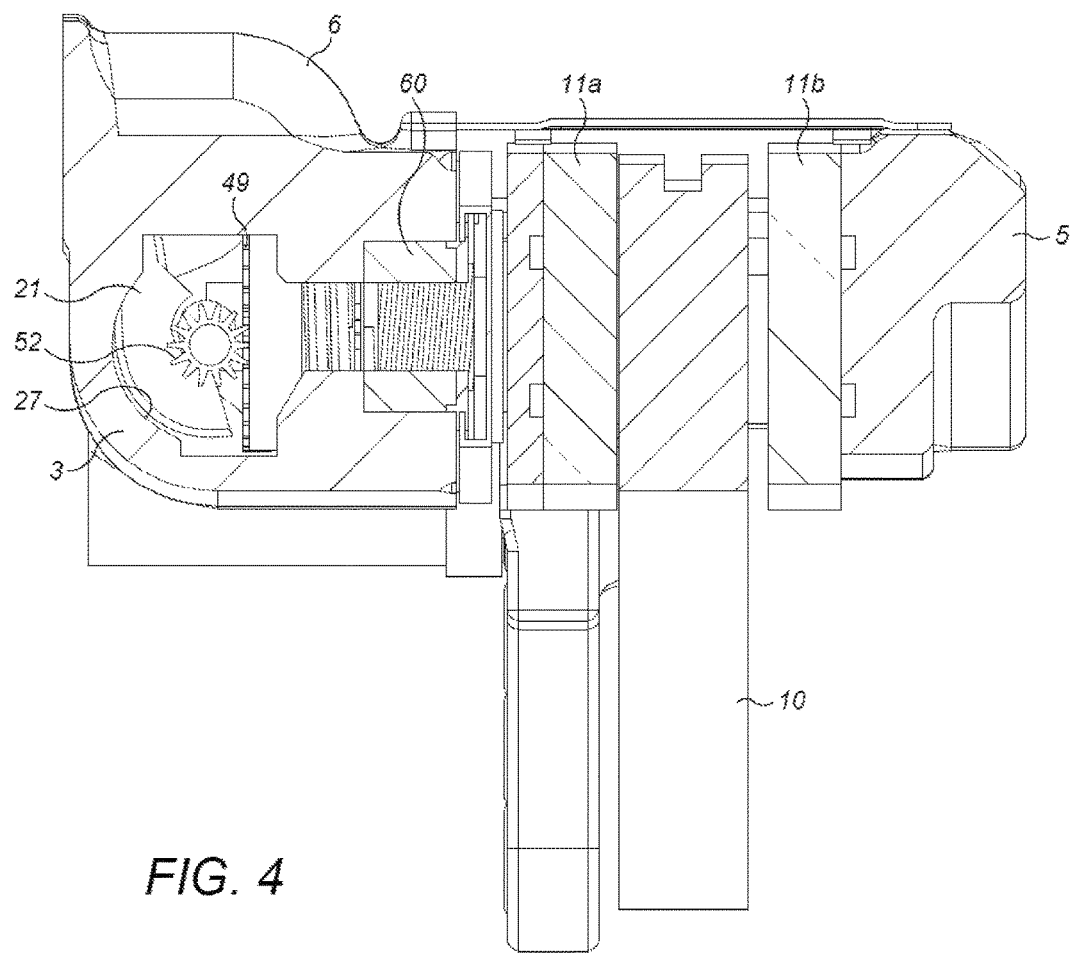
FIG. 4 is a side cross-sectional view through the brake of FIG. 1 on a radial inboard-outboard plane offset from a center line of the brake.

FIGS. 1, 2 and 3 illustrate a disc brake 2 of the present invention. The disc brake incorporates an actuation mechanism comprising a single piston suitable for a commercial vehicle, for example a trailer of a tractor-trailer combination.

Various orientations of the disc brake are described. In particular the directions inboard and outboard refer to the typical orientation of the disc brake when fitted to a vehicle. In this orientation the brake pad closest to the center of the vehicle is the pad directly actuated by an actuation mechanism and being the inboard pad, and the outboard pad being one mounted to a bridge portion of the caliper. Thus inboard can be equated with an actuating side of the disc brake, and outboard with a reaction side. The terms radial, circumferential, tangential and chordal describe orientations with respect to the brake rotor. The terms vertical and horizontal describe orientations with the disc brake mounted uppermost on an axle, whereas it will be appreciated that in use such a disc brake may adopt any axle orientation depending upon packaging requirements of the vehicle.

The disc brake 2 comprises a caliper 3 having a housing 6 to accommodate the actuation mechanism and which is slideably mounted on a carrier 4 for movement in an inboard-outboard direction.

An inboard brake pad 11a comprises a layer of friction material 13 facing the rotor 10, is mounted to a spreader plate 12, and is described in more detail below. The pad 11a is moveable in the direction of arrow 14 against the brake rotor 10.

Suitable means are provided to urge an outboard brake pad 11b against the opposite side of the rotor 10. In this embodiment, such means comprises a bridge 5 arranged so as to straddle a rotor 10 and to transmit the reaction force from an inboard operating shaft 21 to the outboard pad 11b. The bridge 5 further defines an opening through which the brake pads 11a, 11b can be fitted and removed radially. In this embodiment the housing 6 and bridge 5 are manufactured as a single monolithic casting, but in other embodiments, the bridge may be bolted or otherwise secured to the housing.

Figure 2A:
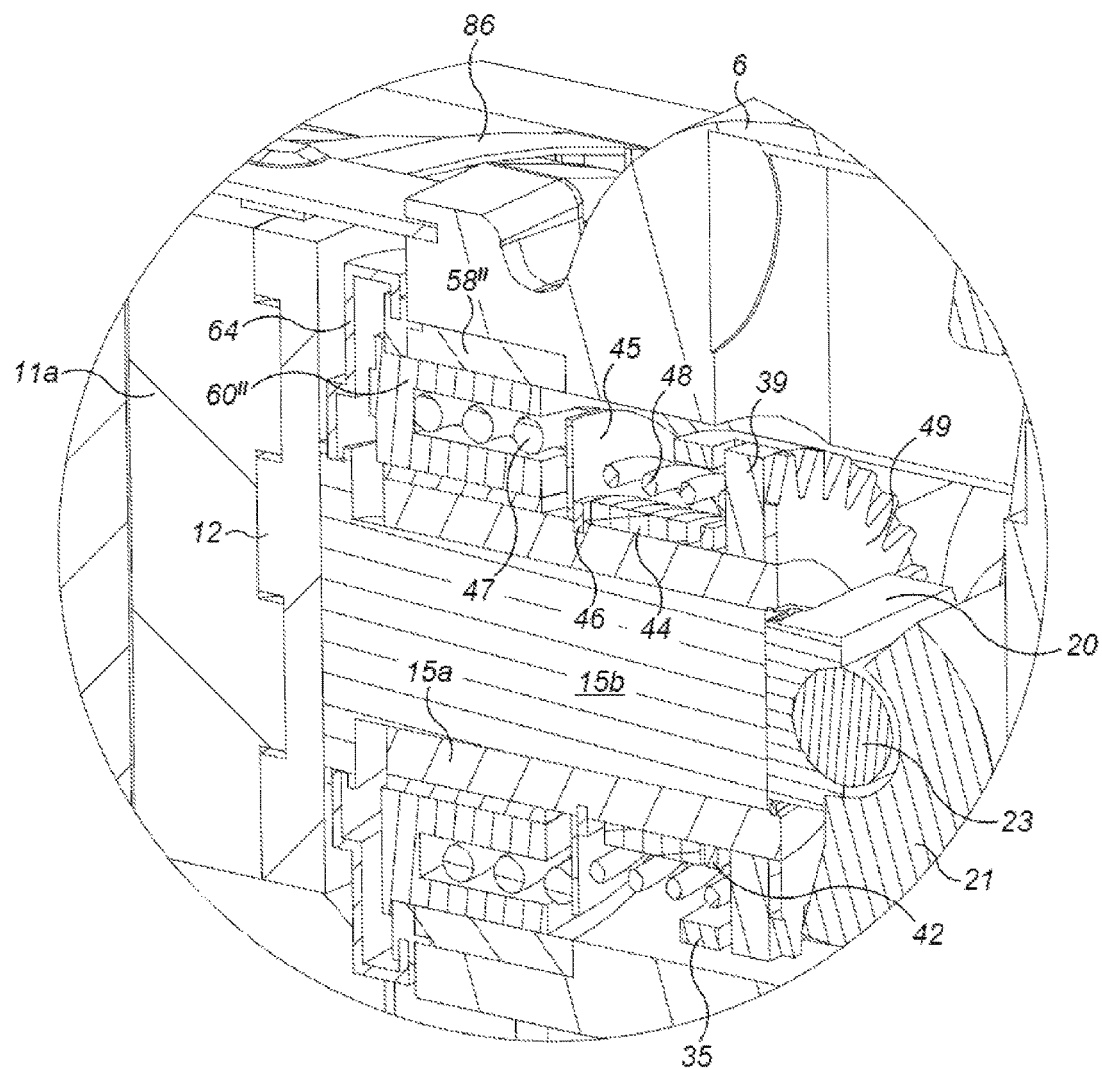
FIG. 2A is a close-up view of a portion of the brake of FIG. 2.

With reference to FIGS. 2, 2A and 3 in particular, the inboard actuation mechanism comprises a single brake piston 15 slideable in the direction of arrow 14 (i.e., inboard-outboard) relative to the rotor 10.

In order to urge the piston assembly in the direction of arrow 14, the operating shaft 21 is pivoted about a transverse axis 22 within a saddle on a single bearing surface 27 of the caliper. The operating shaft 21 supports a roller 23 whose axis 28 is parallel and offset from the axis 22 and couples with a follower 20 in a semi-circular recess thereof. A surface 19 of the follower 20 opposing the recess is in slideable contact with an inboard end face of the piston 15 so that no transverse movement of the piston is required.

Figure 5:
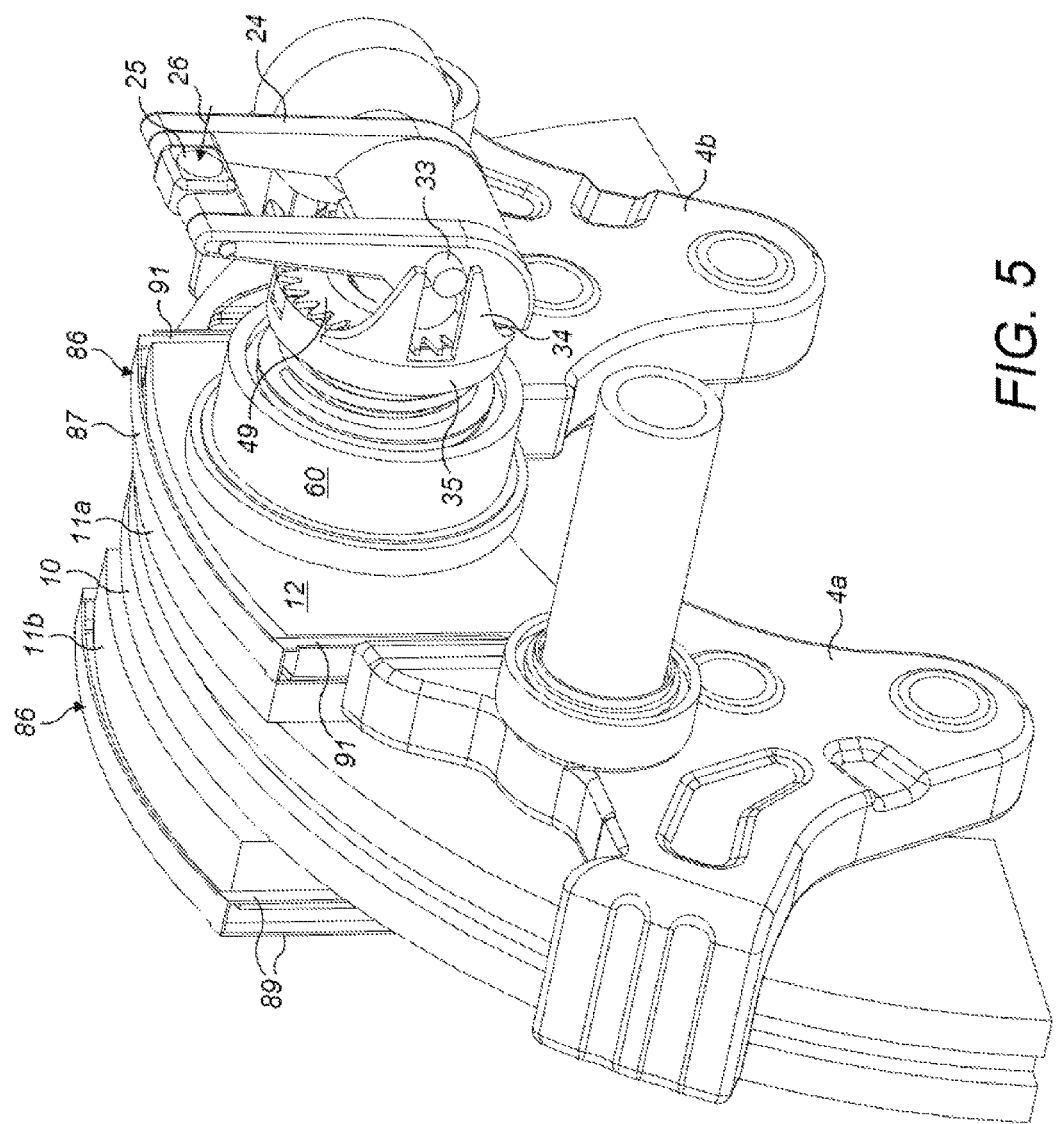
FIG. 5 is an isometric view of the actuator arrangement of the brake of FIG. 1.

The operating shaft 21 further comprises a lever 24 having a pocket 25 adapted to receive an output push rod (not shown) of a brake actuator (e.g., an air chamber). The lever 24 is, in this embodiment, shaped as an inverted "U" (see FIG. 5 in particular) and the line of action of the brake actuator (from pocket 25) is substantially over the line of action of the piston 15.

In other embodiments, another form of cam surface instead of roller 23 may be employed (e.g., a plain bearing) and/or the arrangement may be reversed with the follower 20 or roller 23 being in contact with the caliper housing 6.

Application of a force in the direction of arrow 26 (FIG. 5) causes arcuate movement of the operating shaft 21 and thus the roller 23 bears on the follower 20 and the follower in turn bears on the piston 15 to urge the brake pad 11a directly against the rotor 10. A reaction force from the operating shaft 21 is transmitted to the bearing surface 27 of the caliper 3 via a needle roller bearing (not shown) and is then transmitted to an outboard pad 11b via the bridge 5, with the outboard pad being urged against the rotor 10, such that the pads 11a and 11b clamp the rotor and effect braking through a frictional drag force.

Wear Adjustment

Figure 6:
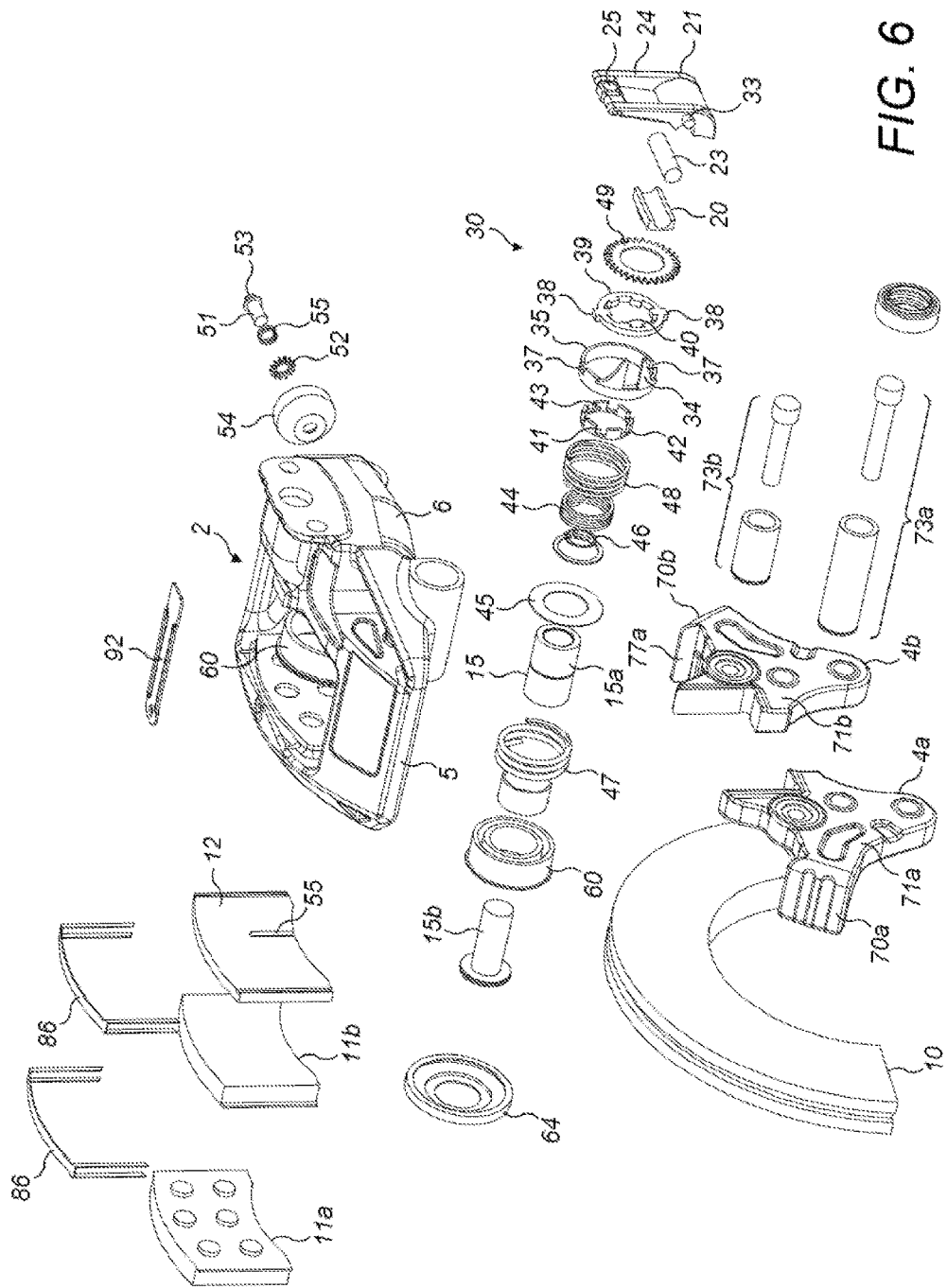
FIG. 6 is an exploded view of the brake of FIG. 1.
Figure 7:
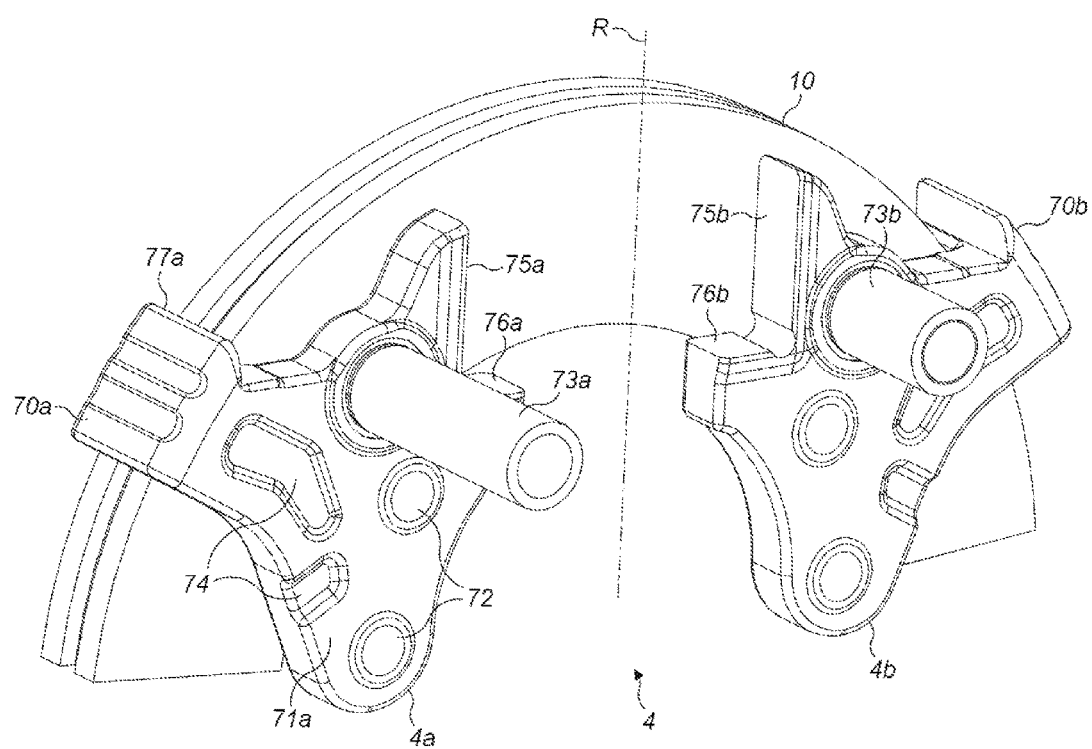
FIG. 7 is an isometric view of the carrier and brake rotor of the brake of FIG. 1.
Figure 8:
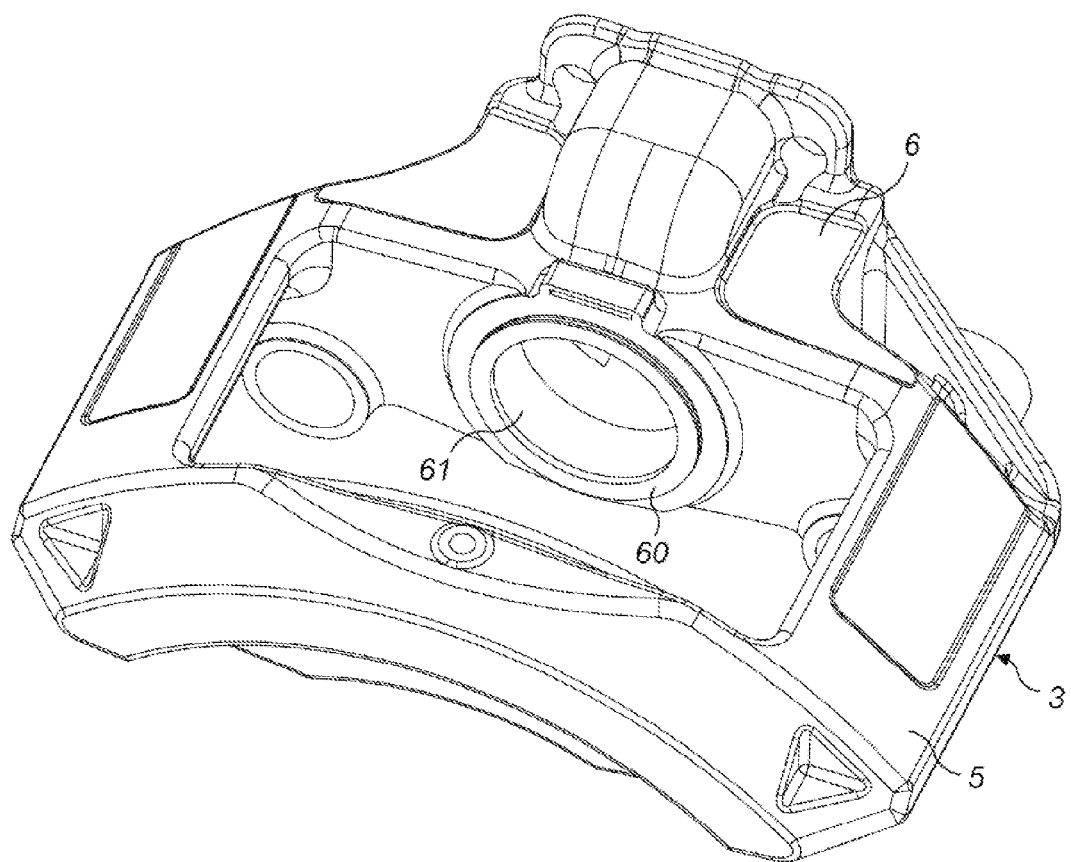
FIG. 8 is an isometric view of the caliper of the brake of FIG. 1.

A wear adjuster mechanism 30 to maintain a desired running clearance between the rotor 10 and pad 11a, 11b is described below. With particular reference to FIGS. 2A and 6, the operating shaft 21 includes an operating arm 33 which extends from the side thereof parallel to the axis of rotation. The operating arm 33 is in driving engagement with a fork portion 34 of a drive ring 35 that is arranged concentrically with the piston 15.

In this embodiment, the drive ring further comprises two opposing recesses 37 which face inboard and are arranged to accommodate a corresponding pair of lugs provided on input plates of a friction clutch 39. In other embodiments alternative arrangements for driving the clutch input plates are contemplated e.g., a different number of recesses, projections rather than recesses, or arm 33 being extended to directly drive the input plates.

The friction clutch further comprises output plates positioned between the input plates. The output plates of the clutch 39 have a number of radially inwardly facing lugs 40 (not present on the input plates) that engage in corresponding recesses 41 in a driven ring 42 that in this embodiment is nested concentrically between the drive ring and the piston 15.

The piston 15 comprises an outer piston 15a having a female thread, with an inner piston 15b having a complimentary male thread located within it.

On the outboard facing edge of the driven ring 42, a relatively small notch 43 is provided that connects to one free end of a wrap spring 44. The wrap spring 44 is arranged to frictionally wrap around an outer portion 15a of the piston 15 and acts as a one-way clutch. In other embodiments other suitable one-way clutches may be utilized, such as ball and ramp, roller clutch/sprag clutch arrangements.

The components above between the operating arm and inner and outer piston define a transmission path of the wear adjuster mechanism.

The wear adjuster mechanism 30 additionally comprises a washer 45 retained by a circlip 46 held in an annular recess of the outer piston 15. An outboard face of the washer 45 is acted on by a return spring 47, the return spring being arranged to retract the piston 15, and therefore the brake pad when a brake actuation cycle ceases. The inboard face of the washer 45 supports a compression spring 48 arranged concentrically between the drive ring 35 and driven ring 42 in order to load the clutch 39 and generate the required amount of friction that controls, the torque at which it slips.

The inboard end of the outer piston portion 15a further has a gear wheel 49 mounted thereto for use with a rewind mechanism, described in more detail below.

The inner piston portion 15b is provided with a pin 50 (FIG. 3) to fit within a complimentary slot 55 in the spreader plate 12 and thereby prevent rotation of the inner piston in use.

In order to maintain a desired running clearance between the brake pads and rotor the wear adjuster mechanism is required to periodically advance the inboard brake pad 11a towards the rotor 10 to account for the loss of friction material 13 due to wear.

In a normal braking operation in which the running clearance is within the desired parameters, as the operating shaft 21 pivots, the operating arm 33 causes the drive ring to rotate. However, a predetermined amount of play or backlash is provided in the system between the recesses 37 and corresponding lugs 38 on the clutch, and as such the drive plates of the clutch do not rotate and no adjustment will occur.

If the running clearance is however greater than the desired range, the aforesaid play is taken up and rotation of the drive plates on the friction clutch 39 will occur. Whilst there is excess running clearance to be taken up, this rotation is transmitted via the driven plates and driven ring to the wrap spring 44, causing the wrap spring to rotate around the outer piston portion 15a in a direction which causes the wrap spring to tighten, transmitting the rotation to the outer piston.

Since the inner piston portion 15b is restrained from rotation, this causes a lengthening of the piston to reduce the running clearance. At the point at which the friction material 13 comes into full contact with the rotor 10 further rotation of the outer piston portion 15a is prevented and the friction clutch 39 slips. Once the braking operation ceases and the return spring 47 acts to push the operating shaft 21 back to its rest position, a corresponding retraction of the inner piston portion 15b is prevented since the wrap spring 44 relaxes and does not transmit a reverse rotation to the outer piston portion 15a.

The co-axial mounting of the adjuster mechanism 30 around the piston 15 minimizes the space required by the mechanism within the housing, resulting in a lighter, more compact housing. The use of the outer surface of the piston as a barrel for the wrap spring, obviates the need for the separate barrels and gears of the prior art and minimizes the number of components required for the brake to function. The outer piston 15a is required to be manufactured from a strong and durable material (e.g., high tensile steel) to close tolerances in order to transmit the clamp load to the brake pad, and is therefore also suitable for use as such a barrel without significant adaptation, save for additional hardening thereof in most circumstances.

An alternative wear adjuster mechanism 130 is described below. Like features are indicated in the figures with like reference numerals, but with the prefix '1'. With particular reference to FIGS. 18 to 21, the operating shaft 121 includes an operating arm 133 which extends from the side thereof parallel to the axis of rotation. The operating arm 133 is in driving engagement with a fork portion 134 of a drive ring 135 that is arranged concentrically with the piston 115.

In this embodiment, the drive ring further comprises an axially extending outer lip having two opposing recesses 137 which face outboard and are arranged to accommodate a corresponding pair of radially outward extending lugs 138 provided on input plates 139a of a friction clutch 139. A further recess can also be seen in FIG. 18, but in this embodiment has no operational function; it simply assists with manufacture of the drive ring, allowing it to be easily pressed from a flat plate to create the axially extending outer lip. In other embodiments, alternative arrangements for driving the clutch input plates 139a are contemplated e.g., a different number of recesses, projections rather than recesses, or arm 133 being extended to directly drive the input plates.

The friction clutch 139 further comprises output plates 139b positioned axially between the input plates. The output plates 139b of the clutch 139 have a number of radially inwardly facing lugs 140 (not present on the input plates) that engage in corresponding recesses 141 in a driven ring 142 that in this embodiment is nested concentrically between the friction clutch 139 and the piston 115.

In this embodiment, the friction clutch 139 is made up of two input plates 139a, and two output plates 139b located between the input plates.

The piston 115 comprises a hollow outer piston 115a having a female thread located on its inner surface, with an inner piston 115b having a complimentary male thread on an outer surface thereof.

A plurality of projections 141a extends radially from an outer surface of the driven ring 142. The recesses 141 are defined between these projections 141a. The projections only extend axially along the driven ring 142 for approximately half its axial length, i.e., an outboard half of the outer surface is smooth. This outboard outer surface of the driven ring 142 provides a surface for locating a first longitudinal end of a wrap spring 144, which frictionally wraps around the outboard outer surface of the driven ring 142. The second longitudinal end of the wrap spring 144 is arranged to frictionally wrap around an outer portion 115a of the piston 115 and act as a one-way clutch.

In this embodiment, the outer portion 115a of the piston includes a shoulder portion 116 projecting radially from a central part of the outer portion 115a of the piston 115. Specifically, it is this shoulder portion 116 that the wrap spring 144 engages and is frictionally wrapped around. As can be seen most clearly from the close up cross-sectional view of FIG. 21, the first end of the wrap spring 144 is wrapped around the smooth surface of the driven ring 142, and the second end of the wrap spring 144 is wrapped around the shoulder portion 116 of the outer portion 115a of the piston 115. An outboard end surface of the driven ring 142 abuts the shoulder portion 116 when the brake is assembled.

The components above, between the operating arm and inner and outer piston, define a transmission path of the wear adjuster mechanism.

In this embodiment, the wear adjuster mechanism also includes thrust bearings 163. A first thrust bearing 163 engages an outboard surface of the friction clutch 139, and a second thrust bearing 163 engages an inboard surface of the drive ring 135. The thrust bearings 163 are annular, and include circumferentially distributed spherical rolling elements 163', which assist with free rotation of the clutch mechanism and drive ring 135, to help reduce friction within the system and wear of the components.

The wear adjuster mechanism 130 additionally comprises a washer 145 that engages the first thrust bearing 163 that is located adjacent the clutch 139. An outboard face of the washer 145 is acted on by a return spring 147, the return spring 147 being arranged to retract the piston 115, and therefore the brake pad when a brake actuation cycle ceases. The force applied by the return spring 147 to the inboard face of the washer 145 also acts to load the clutch 139 (via the thrust bearing 163) and generate the required amount of friction that controls the torque at which it slips.

The inboard end of the outer piston portion 115a further has a gear wheel 149 mounted thereto for use with a rewind mechanism, described in more detail below.

The operation of the wear adjustment mechanism is as described above (previously with reference to FIGS. 2 and 6A), except the driven ring is no longer in communication with the wrap spring via a tang of the wrap spring engaging with a notch of the driven ring; the wrap spring directly engages the outer surface of the driven ring.

This helps to minimize any potential backlash that may occur between the driven ring and the wrap spring, which can help to reduce wear of the components. Uncontrolled unwinding of the spring is minimized, which provides a more predictable, and hence controllable, friction level. The wear on the outer surfaces of the piston and driven ring is also reduced. This could, for example, obviate the need to heat treat these outer surfaces, reducing manufacturing costs. The arrangement also helps to remove any uncertainties that may arise after manufacturing of the components, for example unpredictable tolerances, which may affect the function of the system.

The co-axial mounting of the adjuster mechanism 130 around the piston 115 minimizes the space required by the mechanism within the housing, resulting in a lighter, more compact housing. The use of the outer surface of the piston 115a as a barrel for the wrap spring, obviates the need for the separate barrels and gears of the prior art and minimizes the number of components required for the brake to function. The shoulder portion 116 of the piston 115a retains the driven ring 142 in the axially outboard direction within the mechanism, and the projections 141a on the driven ring 142 limit movement of the wrap spring 144 in the axially inboard direction, without the need for separate circlips, or other similar retaining components.

Rewind Mechanism

Once the friction material 13 has worn to its design limit, it is necessary for the brake pads 11a and 11b to be replaced. In order to accommodate the extra depths of unworn new pads as compared to worn old pads, it is necessary for the piston 15 to be rewound back to its retracted position.

To this end, a rewind shaft 51 is provided, having a bevel gear 52 mounted at an inner end thereof to mesh with the gear wheel 49. A hex head 53 or other suitable interface is provided at the outer (user accessible) end to which a spanner, wrench or other suitable tool may be attached to effect the rewinding operation.

In one embodiment, the shaft 51 is mounted within a transverse cylindrical opening 57 cast or machined in the caliper. A support 54 including a plain bearing rotatably supports the shaft. In this embodiment the support 54 is formed in a sheet metal e.g., sheet steel having a cylindrical portion, a truncated cone portion and a disc shaped portion all formed monolithically from a single piece of metal in a drawing or pressing operation.

A peripheral seal (not shown) may be bonded to the outer face of the cylindrical section without the use of adhesive, due to it being formed as an overmolding, causing it to be secured thereto by solidification of the sealing material when liquid during the molding operation. In other embodiments a separate sealing component, such as an O-ring, may be used. Additionally, in some embodiments the shaft may have multiple supports along its length.

In this embodiment, a helical spring 55 may be provided between the support 54 and hex head of 53 of the rewind shaft 51 so as to bias the bevel gear 52 out of engagement with the gear wheel 49, to reduce the risk of accidental rewinding of the wear adjuster mechanism 30.

It will be appreciated by those skilled in the art that the mounting arrangement for the rewind shaft 51 maintains effective sealing of the caliper whilst reducing the amount and mass of the parts required. Further the opening 57 may additionally be utilized to provide access for machining of the bearing surface 27.

Piston Guidance

Referring now in particular to FIGS. 2, 2A, 3, 8 and 9, the mounting arrangement of the piston 15 and adjustment mechanism 30 within the caliper 3 is apparent. It can be seen from FIG. 3 in particular that the cavity within which the actuation mechanism is mounted is essentially "T" shaped in plan view, comprising a first cylindrical bore 56 extending inboard-outboard, and the second partially cylindrical bore 57 extending transverse to the first and intercepting therewith.

In certain embodiments the cavity may be formed by casting using suitable cores and little or no machining, in other embodiments the cavity may be formed solely by machining from the rotor side inboard to form cylindrical opening 56 and transversely to form the opening 57. In other embodiments a combination of casting and machining may be used. In all of these embodiments, it will be apparent however that the cavity 56, 57 is a simple shape compared with those of the prior art resulting in simplified manufacturing of the caliper 3.

Additionally, since the bore 56 is cylindrical, the complex cast and machined cover plates of the prior art are no longer required to close off the rotor side of the cavity and prevent the ingress of foreign matter.

In place of cover plates, a pre-machined cylindrical guide insert 60 is utilized, which is provided with a machined bore 61 to guide the piston 15.

Figure 12:
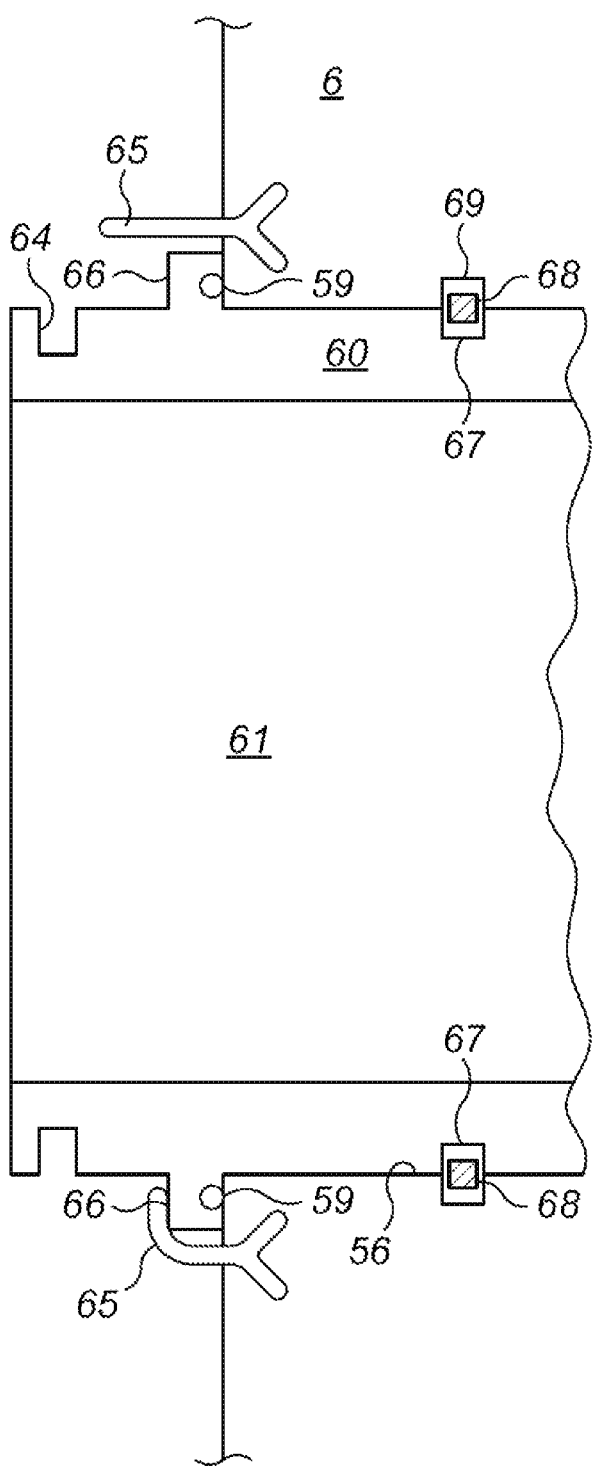
FIG. 12 is a detail view of a mouth of a cylindrical bore of the caliper with an alternative arrangement for mounting a guide insert.
Figure 13:
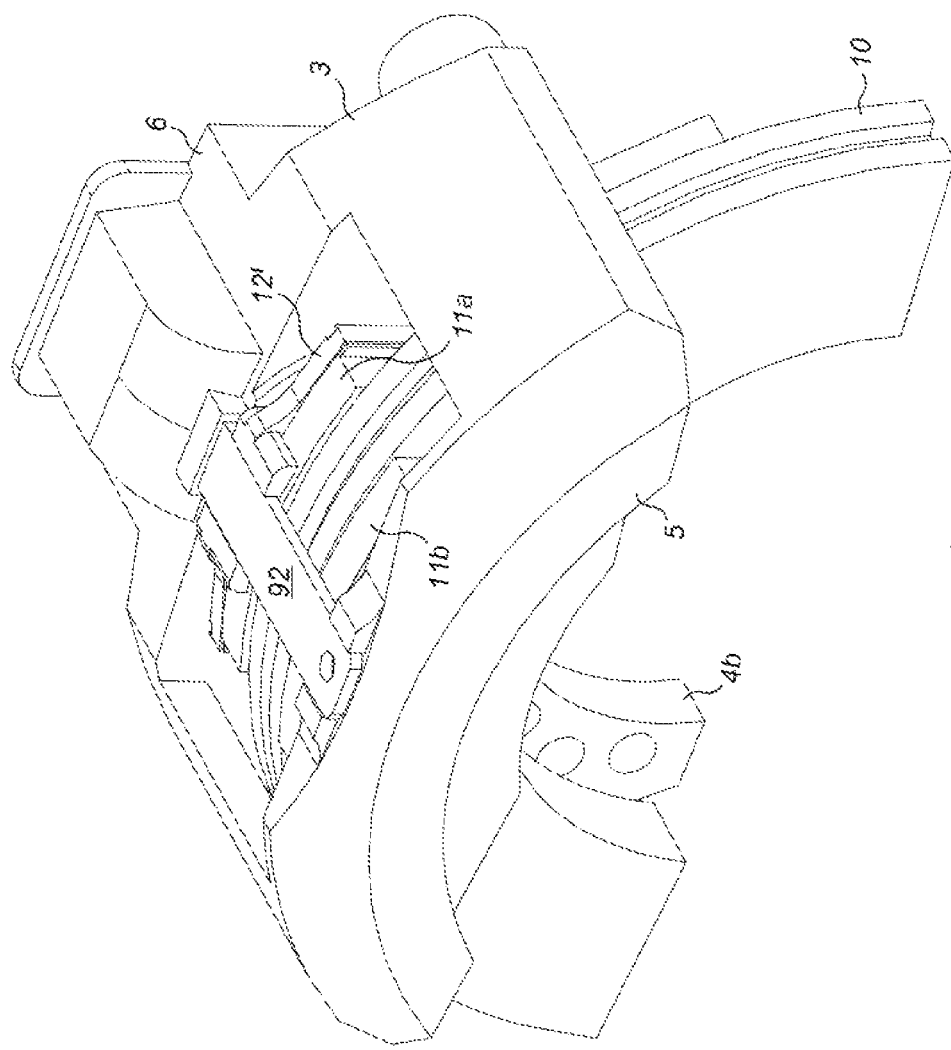
FIG. 13 is an isometric view of the brake according to FIG. 1, but with an alternative embodiment of spreader plate.
Figure 14:
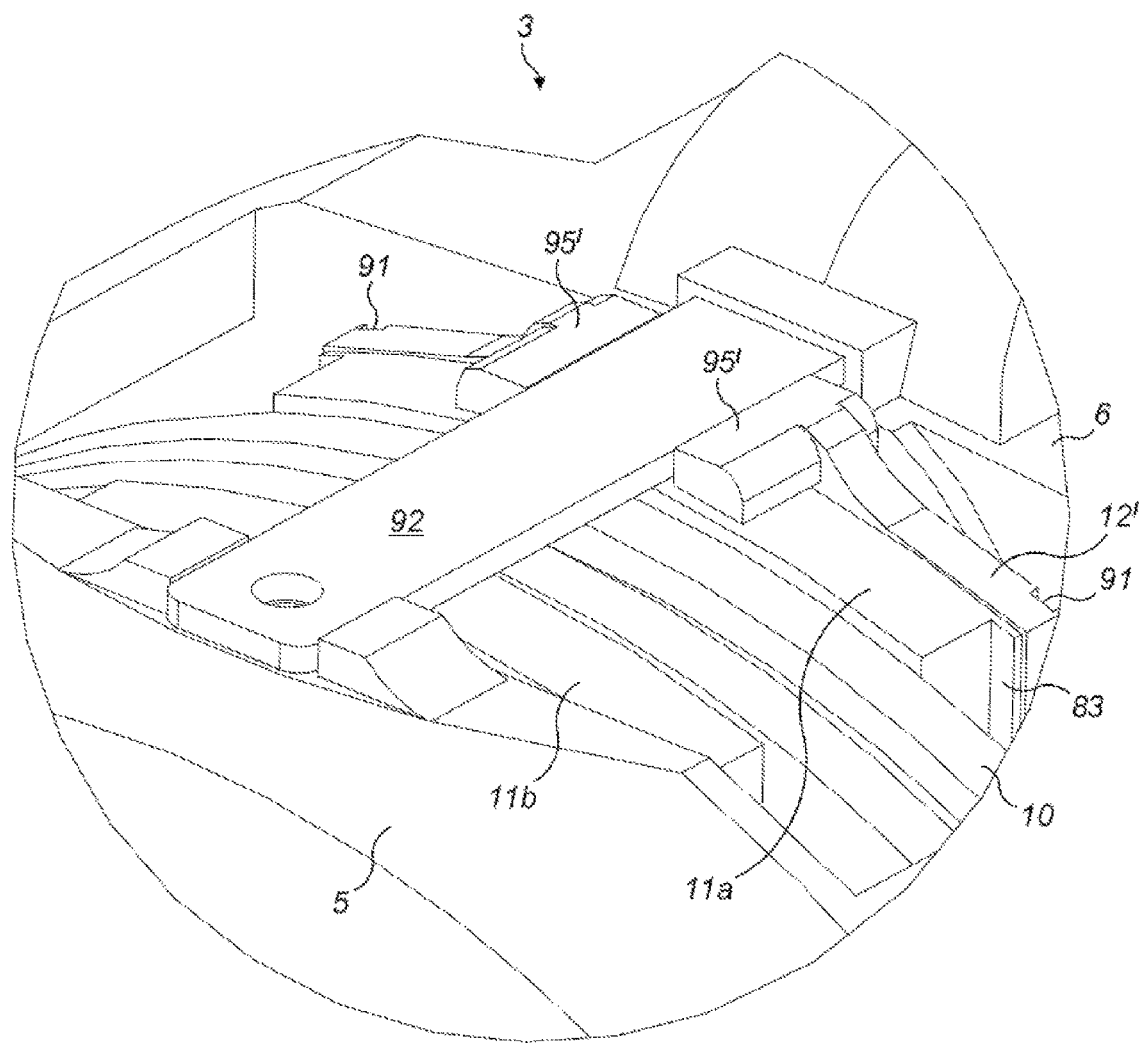
FIG. 14 is a detail isometric view of the brake pads and spreader plate, with the brake pads in an unworn condition.
Figure 15:
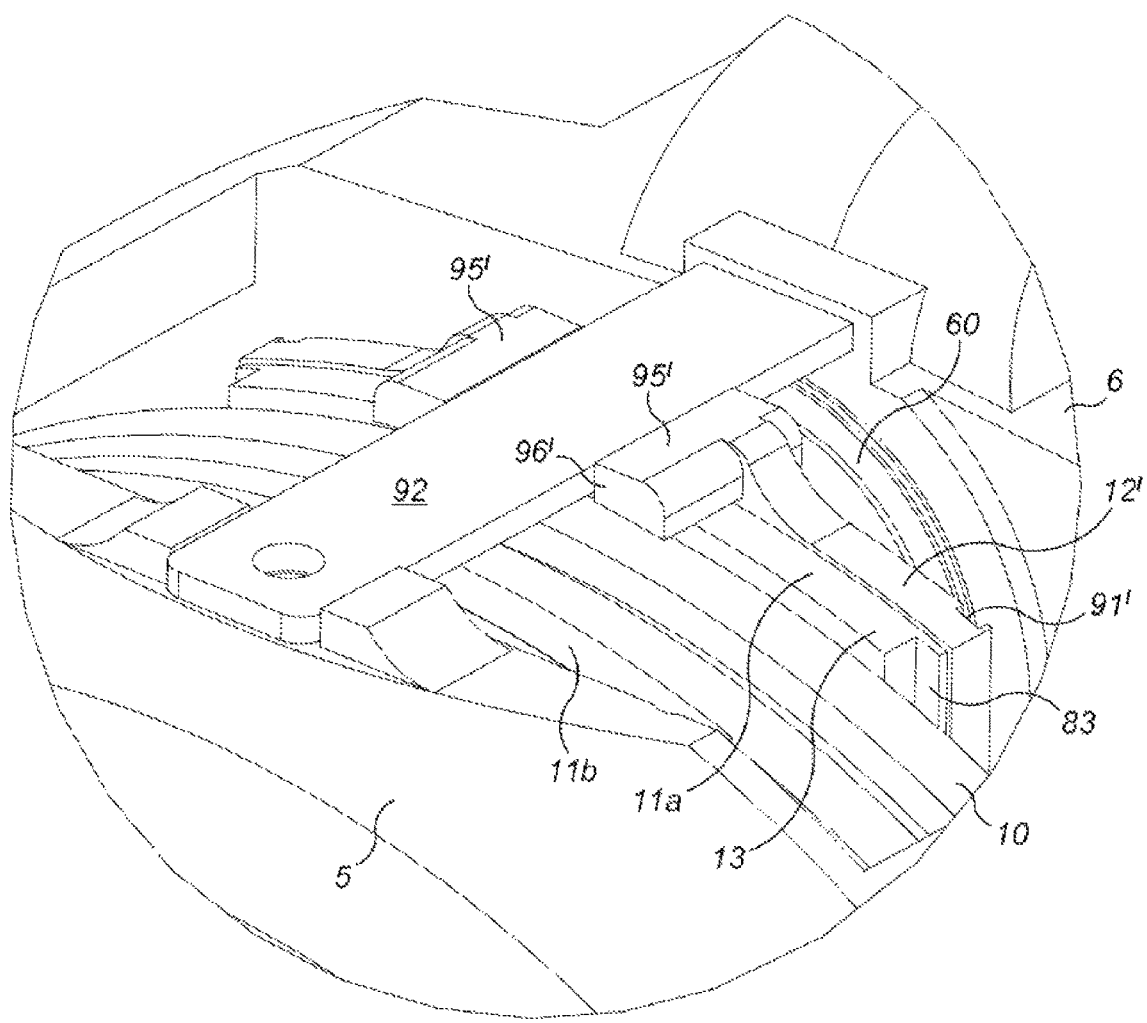
FIG. 15 is the same view as FIG. 14, but with the brake pads in a part worn condition.

The guide insert 60 further comprises an annulus 62 closed at an outboard end to act as a pocket for receiving and guiding the return spring 47. With reference to FIG. 12, a radially outward facing recess is also provided proximate the outboard end thereof in which a sealing element such as a convoluted sealing boot 64 may be secured.

The guide insert 60 may further comprise a circumferential recess 67 in the outer circumferential surface thereof to accommodate a circlip/snap ring 68, as well as a further annular recess to accommodate an O ring type seal 59 in order to prevent foreign matter from entering the join between the guide insert 60 and caliper. The bore 56 is, in this embodiment, provided with a circumferential groove 59 at an appropriate location into which the circlip/snap ring can relax and hold the guide insert 60 into place.

Various arrangements are contemplated for mounting the guide insert 60 into the caliper 3. These arrangements include mounting the guide insert 60 via a taper fit, interference fit or threaded fit to the caliper 3, or by using an additional fastener such as the aforementioned circlip/snap ring or a canted clip, or a radially oriented bolt as a set screw. In one embodiment, as shown in FIGS. 2 and 2A, an intermediate internally threaded sleeve 58" is cast into or otherwise secured into the caliper housing. The guide insert 60" has a complementary externally threaded surface which enables it to be screwed into the bore 56. In this embodiment the sleeve 58" is additionally provided with a lip having a recess to accommodate the sealing bolt 64.

However, with reference to FIG. 12, in a preferred embodiment the caliper 3 is cast with a metal insert 65 protruding from the face thereof adjacent to where the guide insert 60 is to be fitted.

The metal insert 65 is shaped such that it is keyed into the cast metal once solidified and is malleable such that it is able to be peened over a lip the outboard face of the guide insert so as to hold the insert 60 in place. In preferred embodiments, the metal insert 65 extends around the entire periphery of the bore 56 (i.e., it is substantially circular). In FIG. 12, the upper section of the metal insert 65 is not yet peened, whereas the lower portion is shown peened over a lip 66 on the insert. The peening process may itself generate a sufficient seal that no additional sealing, such as the O-ring 59, is required.

In a preferred embodiment a secondary means of securing the guide insert 60 is preferably provided. In order to remove and replace the guide insert 60, for example during a maintenance or a remanufacturing operation, the peened material needs to be permanently removed. Consequently it cannot be used for retaining a replacement guide insert 60. Therefore, as mentioned above, the circlip/snap ring 68 may be utilized as such a secondary retaining arrangement when a replacement guide insert is fitted.

Thus, whilst FIG. 12 shows both the peened metal insert 65 and the snap ring 68 in use, in practice, for a first installation the peened insert only would be used, and for a replacement the snap ring 68 only would be used. As such an original fit guide insert may lack the groove 67 whereas an aftermarket replacement may lack the lip 66.

It will be appreciated that part or all of the actuation and adjustment mechanism may be advantageously be fitted to the caliper 3 as a pre-assembled unit, together with the guide insert 60 via the cylindrical opening 56. This assembly method is possible due to the compact nature of the actuation mechanism, and in particular the operating shaft with a single central bearing surface facing the inboard face of the housing 6.

One advantage of the peening approach or circlip/snap ring mounting is that assembly of the insert, together with the piston 15, operating shaft 21 and wear adjuster mechanism 30 is easier to achieve with the fit between the insert and caliper being relatively loose, in order that the parts may be aligned in the correct location for subsequent operation. This may be easier to achieve with these mounting methods, than with alternative threaded or interference fits.

Brake Carrier

Referring now to FIGS. 1, 3, 5, 6 and 7, the carrier 4 can be seen in more detail.

A significant difference between the carrier 4 of the present invention and those of the prior art is that the carrier is formed from two portions 4a and 4b and a gap or space is present where a connecting beam conventionally connects a leading side of the inboard brake pad 11a support to a trailing side.

A further significant difference between the present carrier 4 and prior art carriers is that the carrier does not include a support for the outboard pad. Rather, the outboard pad 11b is supported directly on the caliper 3 radially and circumferentially. Additionally, due to the increased turning moment caused by the outboard pad drag load being directed through the caliper 3 rather than the carrier 4, the carrier further comprises support wings 70a and 70b extending at least partially over the rotor 10, and being able to contact and support the caliper 3 during a braking operation.

Considering the carrier 4 in more detail, in this embodiment, the carrier portions 4a and 4b generally have mirror symmetry about an inboard-outboard plane defined by a central radial axis R thereof. Portion 4a comprises a generally planar main body 71a having two threaded bores 72 extending inboard-outboard. These bores are provided to mount the portion 4a to a suitable bracket on a rotationally fixed portion of a vehicle such as an axle or steering knuckle (not shown) via bolts (not shown). In other embodiments the mounting may be "tangential"—i.e., the bores extend in generally the same direction in which a brake pad is fitted and removed from the carrier. Moreover, the number of bores may be altered as required, and/or keying features may be provided to positively engage the carrier portion with the bracket.

The main body 71a additionally comprises a threaded bore (not visible) for mounting a guide sleeve 73a thereto for the caliper 3 to be able to slide thereon in an inboard-outboard direction.

An L-shaped profile is additionally formed in the portion 4a so as to provide a vertical (circumferential) abutment surface 75a to transfer the drag load when the brake is applied from the inboard brake pad 11a and transmit the load to the axial steering knuckle. The L-shape additionally provides a horizontal (radial) abutment surface 76a so as to support the inboard brake pad 11a in a radially inward direction, and maintain its correct position with respect to the rotor 10. In order to avoid a stress raising angle, a curved recess (not visible for portion 71a but visible in portion 71b) is provided in this embodiment. The carrier does not extend circumferentially further than the horizontal abutment surface, thus saving weight.

A wing 70a extends out over the rotor 10 in a direction substantially at 90o to the major plane of the main body 71a. The wing 70a defines a substantially vertical guide surface 77a arranged so as to take and transfer circumferential loads induced by twisting of the caliper 3 under braking to the carrier directly, rather than via the guide sleeves 73a and 73b. The surface may be machined to achieve a smooth controlled surface finish.

It will be appreciated that in prior art carriers, the beam interconnecting the horizontal abutment surfaces 76a and 76b has a primary purpose of maintaining the spatial relationship between the leading and trailing edge portions of the pad abutments. In this embodiment, such a spatial relationship may be maintained due to the interface between the support wings and the caliper for transportation and fitting instead.

The present applicant has recognized that maintaining this spatial relationship is beneficial for transportation of a carrier and caliper combination, during installation on a vehicle. However a number of benefits accrue to the separation of the carrier into the two portions 4a and 4b. Firstly, this enables the portions to be manufactured as a forging rather than a casting together with the wings 70a and 70b, something that would not be readily achievable if a single integral and monolithic carrier were to be manufactured. For high volumes of components, forging may be more cost-effective, and the resultant components may be stronger and require less machining than comparable cast components.

Secondly, it will be appreciated that the abutment surfaces 75a, 76a, 75b, 76b typically require some machining and in some circumstances heat treating. In particular, the machining to achieve smooth planar surfaces is simplified in the arrangement of the present invention since each portion can be located rigidly during the machining operation, meaning that deflection is reduced, and accuracy of machining is therefore easier to achieve.

Thirdly, the portions 4a and 4b require less space in transit when not assembled into the brake, since they can be stacked more efficiently, reducing shipping costs. In order to avoid the assembled caliper and carrier combination becoming misaligned during shipping, a suitable spacer may be provided that prevents the carrier portions rotating in an unwanted manner about the guide pins.

It would be appreciated that some of the aforementioned benefits will continue to be present when the carrier portions are used in conjunction with an outboard carrier portion that is bolted to the inboard portion, or otherwise secured thereto, and takes the load from the outboard pad.

It will additionally be noted that the guide pin 73a is longer than the guide pin 73b as pin 73a is the leading pin and intended to take the majority of the load from the caliper. However, the leading and trailing pins can simply be reversed by unbolting them from the position shown in FIG. 7 and switching their positions. In all other respects, portions 4a and 4b are identical mirror images in this embodiment.

The absence of the beam may also enable, in some embodiments, the brake pads to be restrained from radial outward motion due to a suitable "dovetail" (undercut) formation on the radially inner edge of the friction material, backplate (if present) and/or a spreader plate such that the usual pad strap may not be needed for this purpose. To release a worn pad, bolts may be removed from one or both of the portions 4a, 4b, the portion may then pivot (either about a remaining bolt and the guide sleeve, or about solely the guide sleeve if all bolts are removed on one of the portions), to a position where the pad is released and a new one may be fitted. In one embodiment, one carrier portion 4a may be secured by a single bolt and the other secured by two bolts. Therefore, only a single bolt may need to be removed in order to release the brake pad. This arrangement may be particularly beneficial where the brake is mounted at a 5 o'clock or 7 o'clock position, both of which are commonplace in trailer applications.

In variants, the first and second portions may differ in the shape and/or materials used. For example, the portion that supports the trailing edge of the pad in the usual direction of rotation may be stronger than the portion supporting the leading edge, either due to a stronger material being used, the portion being subjected to a different treatment, or to the portion having a different shape to impart more strength.

Further the guide sleeve may be integrally formed with the main body of each portion as part of one single casting, or the guide sleeve may be press-fitted or friction welded therein. Due to the simpler overall shape of each portion as compared to a conventional carrier, integral casting of the guide sleeves may be easier to achieve.

Brake Pads

Turning now to FIGS. 1, 3, 6, 10 and 11, the brake pads of the present invention can be seen in more detail. As mentioned above, the outboard brake pad 11b is supported entirely by the bridge 5 of the caliper 3.

A support surface 80 is provided in the bridge 5 in a spaced parallel relationship with the rotor 10, and facing the rotor. In this embodiment the surface 80 has a key formation for the pad in order to mechanically restrain the pad from motion in a circumferential direction and in a radial direction. In this embodiment the formation comprises a series of circular depressions 81 which mate with complimentary circular projections 82 on a support face 93 of the pad. In other embodiments other suitable key formations may be utilized Conventionally, brake pads for air actuated disc brakes of the type used in heavy vehicles are typically provided with a metallic backplate that imparts additional strength, rigidity and toughness to the pad as a whole and is fused and/or mechanically connected to the friction material. The backplate also typically enables a pad spring to be mounted to the brake pad in order to resiliently restrain the pad from radially outward motion in use. However, the present applicant has recognized that backplates add to the weight, volume and cost of brake pads and in certain situations may not be required.

Therefore, as in the present instance where it is possible to support the friction material across its entire surface area on the bridge 5, and where impact loads to abutment surfaces of a carrier will not be experienced, it is possible to dispense with the backplate. Nevertheless, in order to ensure the outboard pad 11b is held in position during operation of the brake, a retaining mechanism to hold the pad to the surface 80 is required.

To that end, in this embodiment, the outboard pad 11b is provided with bearing surfaces in the form of tongues 83 extending the entire height of the vertical end faces of the pad 84. The tongues 83 are provided proximate the outboard face having projections 82 and are relatively thin in proportion to the depth of the pad as a whole. For a typical pad having a depth of 21 mm, the depth of the tongues is typically around 5 mm, but may be in a range of 8 mm to 3 mm, preferably 6 mm to 4 mm.

Figure 9:
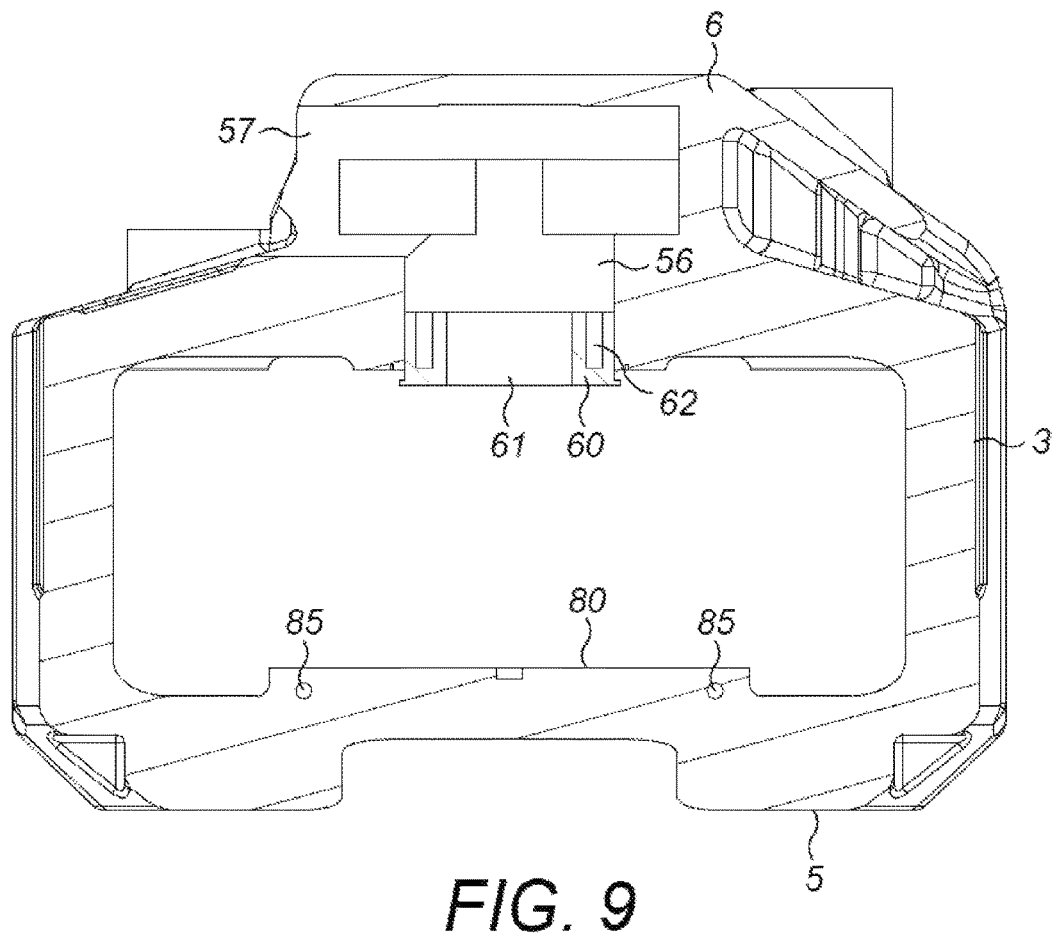
FIG. 9 is a cross-sectioned plan view of the caliper of the brake of FIG. 1.
Figure 10:
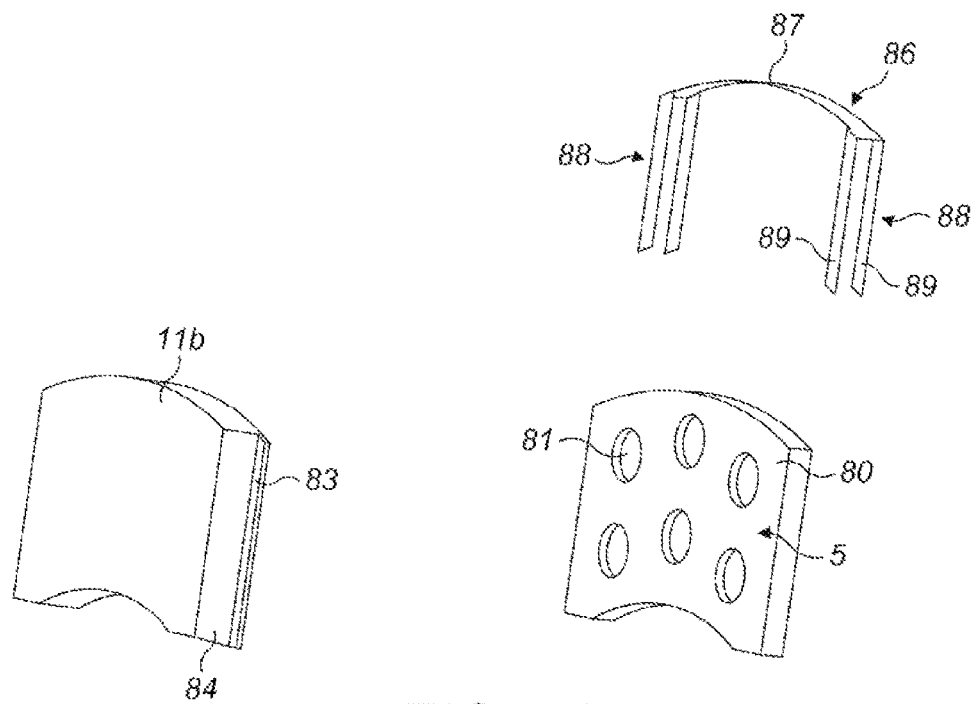
FIGS. 10 and 11 are exploded perspective views of outboard and inboard brake pads and of the brake of FIG. 1.
Figure 11:
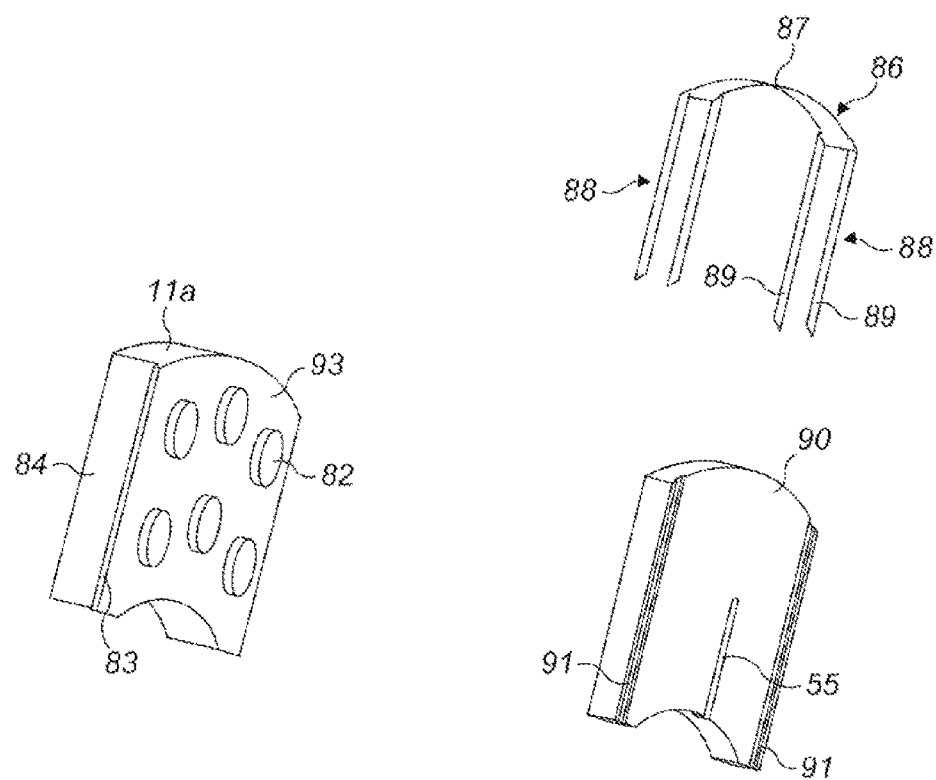

As can be seen in FIGS. 3 and 9 spaced, parallel chordally extending bores 85 are formed in the bridge 5 outboard of the support surface 80, aligned to the intended position of tongues 83 when the pad 11b is installed.

To hold the outboard pad 11b in position a pad retainer clip 86 is provided which comprises an upwardly arched resilient pad spring portion 87, each end of which terminates in a downwardly extending resilient forked retainer section 88 having two prongs 89 biased towards each other. One prong 89 of the fork engages behind the respective tongues 83 of the pad and other fits within the adjacent bore 85 behind support surface 80. Thus the pad 11b is held at each circumferential end against the support surface in an outboard direction.

The friction material 13 itself is intended to act as the bearing surface (tongue) having sufficient mechanical strength to be held to the support surface 80. However friction material is a composite material and typically has a low tensile strength. It is nevertheless desirable for the bearing surface to be as thin as possible so as to minimize the amount of friction material that cannot be utilized and remains unworn because the prongs 89 are in contact with the rotor 10. Therefore, the tongue portions 83 and the surrounding sections of the main body of the outboard brake pad may be strengthened by utilizing an increased proportion of steel fibers, or the like within the composite material to improve its performance in tension. In other embodiments, the bearing surface may be formed by a bore extending through some or all of the height of the pad parallel to the bore 85.

In this embodiment, the inboard pad 11a is of identical construction and shape to the outboard pad 11b, also comprising a tongue 83 projecting from the vertical end faces 84 thereof. However, with reference to FIG. 11 it will be appreciated that the pad 11a is intended to be mounted against the spreader plate 12 manufactured from substantially rigid steel or cast iron material that is utilized to uniformly transfer the load from the piston to the inboard pad 11a with little or no flexion thereof.

Channels 91 are provided in the rear (inboard) face of the spreader plate to accommodate and hold one of the prongs 89 of the retainer 86, the other being in engagement with the tongue 83 of the pad 11a in a similar manner to the tongue 83 of pad 11b. A similar key formation of depressions 81 in the backplate and projections 82 in the friction material is utilized to engage the pads to the backplate.

Fitting of the pads 11a, 11b to the spreader plate or housing is achieved firstly by removing a pad strap 92 spanning the caliper housing and bridge, sliding the pad in radially inwardly with suitable clearance between the rotor and spreader plate 12 or support surface 80, aligning the projections 82 and depressions 81, and then sliding the pad retainer clip 86 radially inwardly with one prong extending over the tongues 83 and the other locating in the channel 91 or bore 85. As such, fitting and removal may be achieved with the caliper and rotor in-situ on a vehicle.

In this embodiment, pads 11a and 11b being identical reduces the number of individual parts needed for the brake, in other embodiments this need not be the case. In some embodiments, different materials may be utilized for the inboard and outboard pads, e.g., to achieve different friction coefficients and therefore loading on the carrier and bridge components, and potentially reducing taper wear by reducing the moment generated by the outboard pad. In this instance, the key formations inboard and outboard may differ to prevent the pads being fitted in the wrong position.

In other embodiments, the dimensions of the pads 11a and 11b may differ in addition to, or instead of differences in material. In certain embodiments two or more discrete pads may be mounted to the bridge 5 or the spreader plate 12 using individual retainer clips or a single common clip for each side. This may be desirable where one pad has friction material suitable for use in a particular operating condition (e.g., high temperature or wet conditions) whereas another may be suited for other conditions. Further, using pads with different wear characteristics adjacent to each other may be another means of controlling taper wear. Specifically, taper wear tends to result in the trailing edge of the outboard pad wearing more than the leading edge, but the leading edge of the inboard pad wearing more. Therefore mounting a pad made from relatively lower wear material in a trailing position at the outboard location, and in a leading position at the inboard location may tend to equalize wear across both inboard and outboard pads. In other embodiments a single pad formed from different friction materials arranged side by side may be utilized, optionally with a common backplate.

In embodiments where multiple discrete pads are to be mounted, additional clips (optionally without the pad spring portion) may retain these pads in additional bores or channels provided in the caliper or spreader plate respectively.

In alternative embodiments the retainer clips described above may be utilized with pads that do have a metallic backplate, which backplate forms the tongues. It is however anticipated that the backplate would be significantly thinner than those of the prior art, leading to many of the benefits outlined above.

Alternative forms of pad retainer clip may be used which do not include the pad spring section, and so are separate for each circumferential end, or which clip the pad to the support in a different manner, such as being clipped together in a circumferential direction rather than a radial direction. In variants only a single retainer clip may be required, e.g., at one circumferential end of the pad, with the tongue at the other end fitting into a complementary fixed slot.

Spreader Plate Guiding

In a further development of the spreader plate illustrated in FIGS. 13 to 17, the spreader plate is configured to be guided on the pad strap 92. Like parts are labelled by like numerals in FIGS. 13 to 17 by comparison with FIGS. 1 to 12. Parts that differ from the embodiments of FIGS. 1-12 have the suffix '.

As noted above one potential problem with single piston brakes, as compared to twin piston brakes, is that of uneven or so-called "taper wear" caused by the greater tendency of the pad to pivot relative to the rotor, due to reduced support from the piston head at the rear thereof.

In this embodiment, the spreader plate 12' is reconfigured to include first and second guide bars 95' that are secured in a radially outward position to the main body of the spreader plate 12' which is intended to transmit load to the friction material. The guide bars 95' extend outboard over the inboard pad 11a, and in this embodiment inboard to a lesser extent. Thus, whereas the spreader plate has a depth of around 10 mm in this embodiment, the guide bars 95' have a depth inboard-outboard of between 35 and 40 mm in this embodiment, preferably around 36-38 mm. By being radially outward of the main body the bars 95' do not contact the rotor 10 as the friction material 13 is worn, and in addition the bars are radially adjacent to the pad strap 92.

The guide bars 95' are spaced from each other by slightly more than the width of the pad strap 92. The guide bars in this embodiment have radially extending abutment surfaces 96' facing inwardly towards the pad strap 92 that are machined to a smooth finish to assist in sliding along the corresponding radially orientated surfaces of the pad strap, both during braking operations, and as the inboard brake pad 11a advances outboard to account for the wear of the brakes pads 11a, 11b and the rotor 10, as is illustrated by comparing the positions of the inboard pad in FIG. 15 by comparison with FIG. 14.

Due to the relatively close running fit between the guide bars 95' and pad strap 92, and the increased depth of the bars compared to the spreader plate 12, it will be appreciated that the degree to which the spreader plate 12, and therefore the inboard brake pad 11a can pivot about a radial axis is significantly limited, thereby limiting the degree to which taper pad wear is able to occur.

Figure 16:
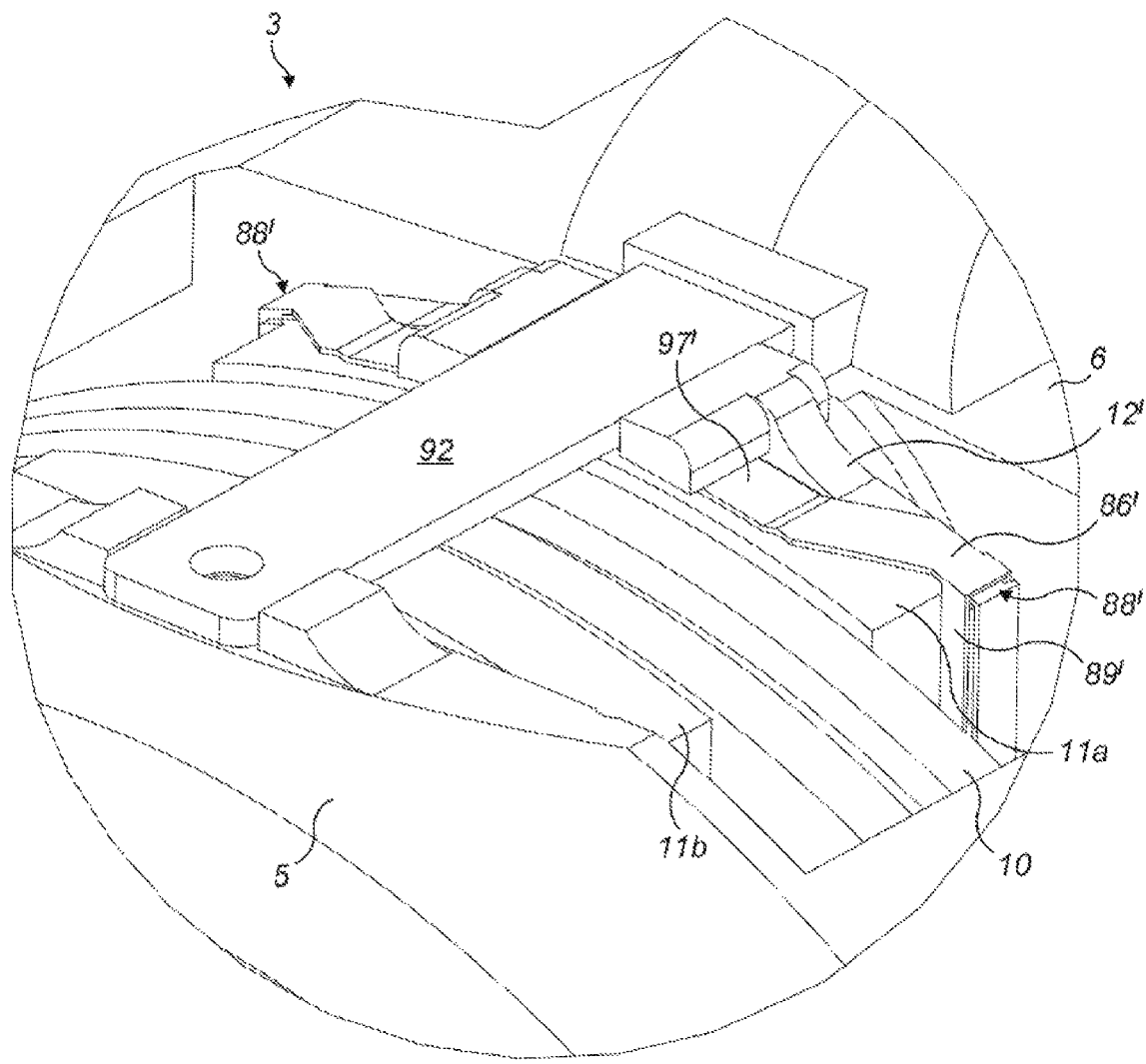
FIG. 16 is a similar view to FIG. 14, but with a pad retainer clip shown in place.
Figure 17:
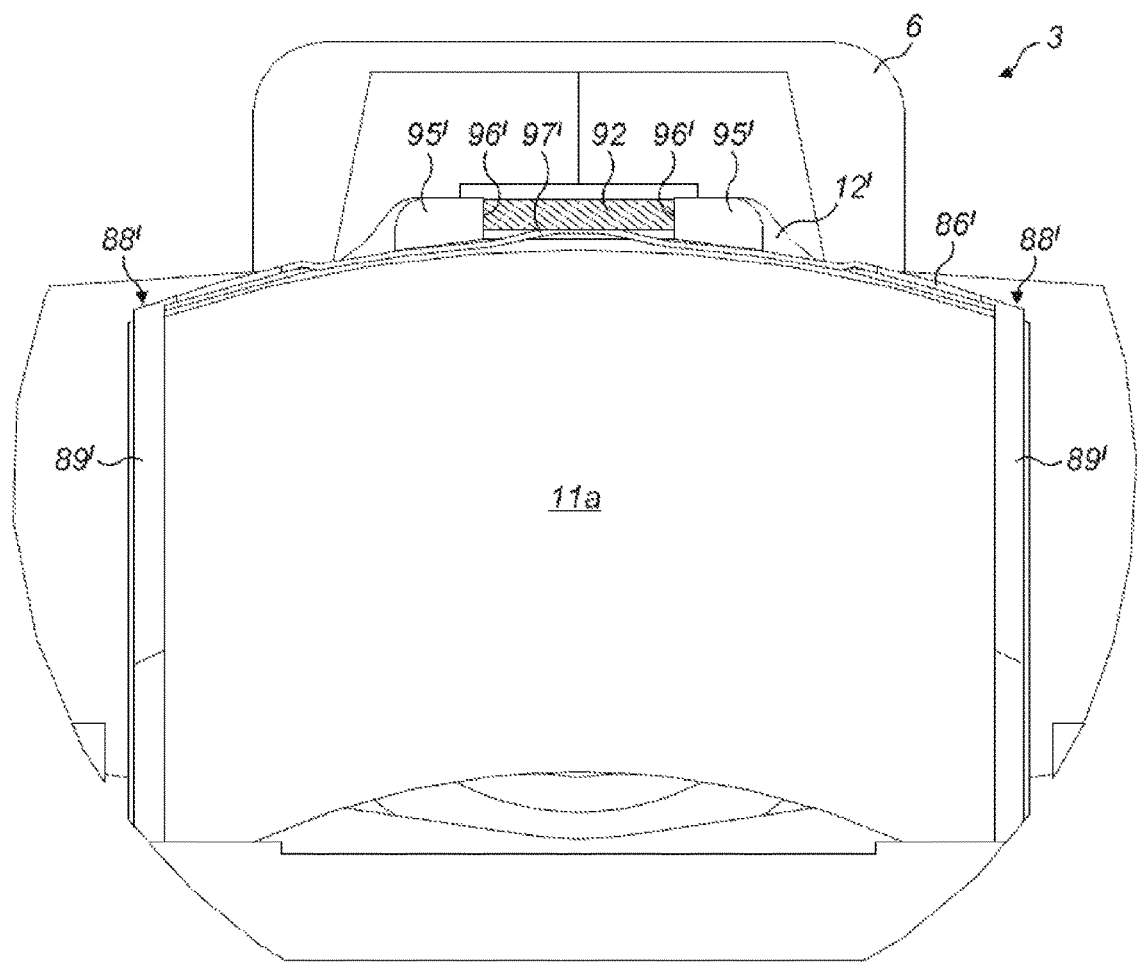
FIG. 17 is an axial view looking inboard of the inboard brake pad, spreader plate, pad retainer clip and pad strap of FIG. 16.
Figure 18:
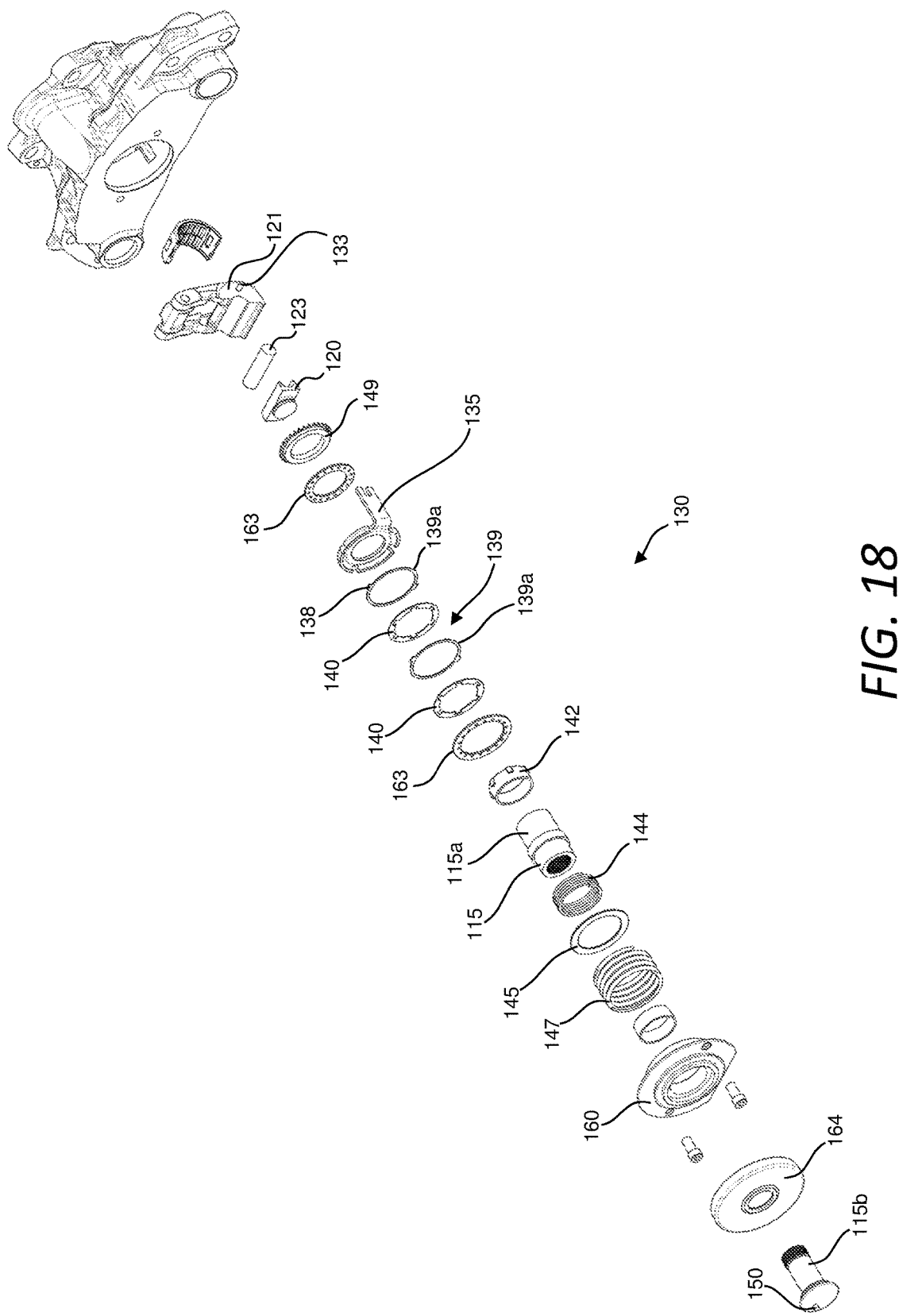
FIG. 18 is an exploded view of an alternative wear adjuster mechanism arrangement.
Figure 19:
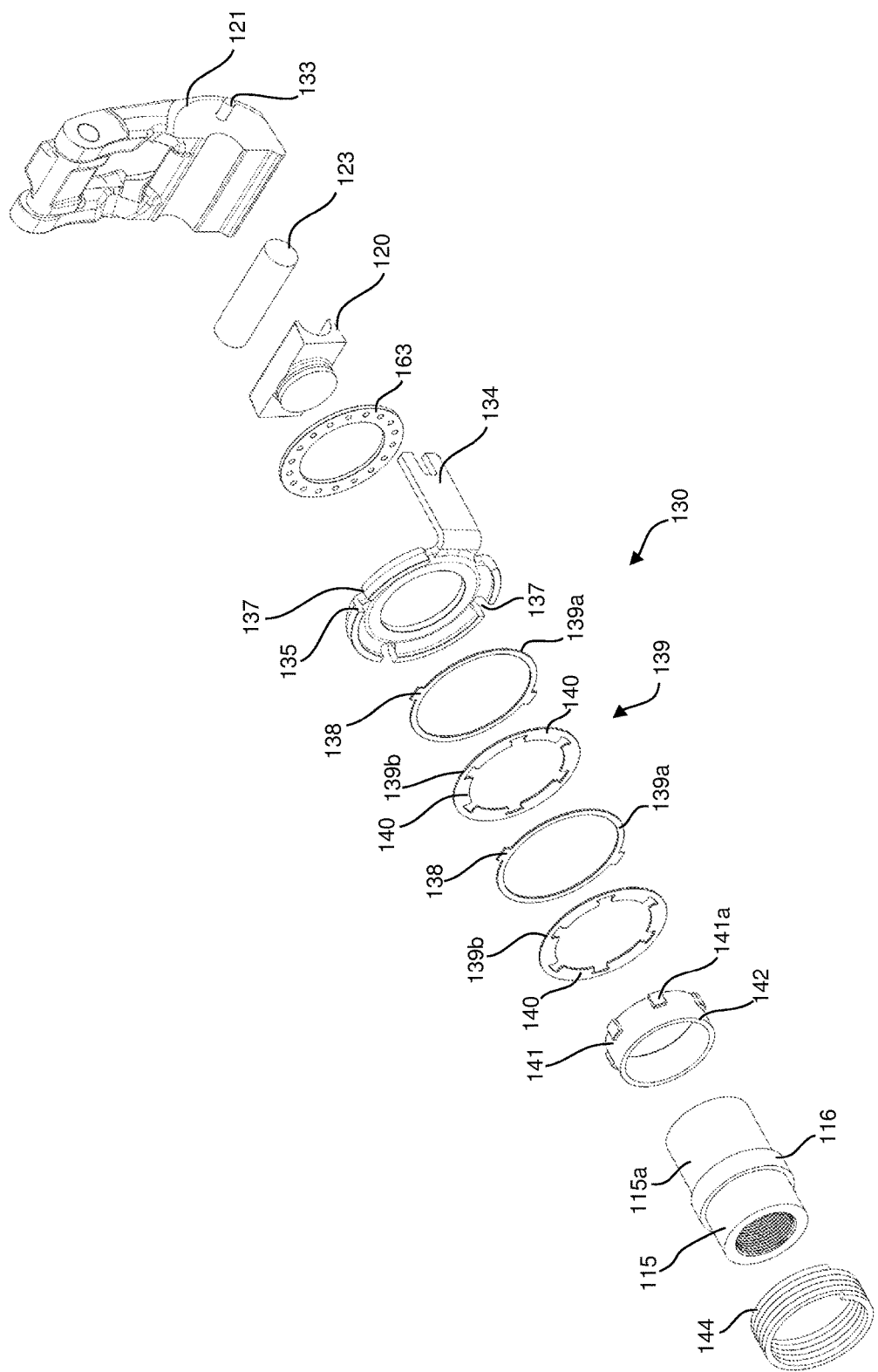
FIG. 19 is a close up of the exploded view of FIG. 18.
Figure 20:
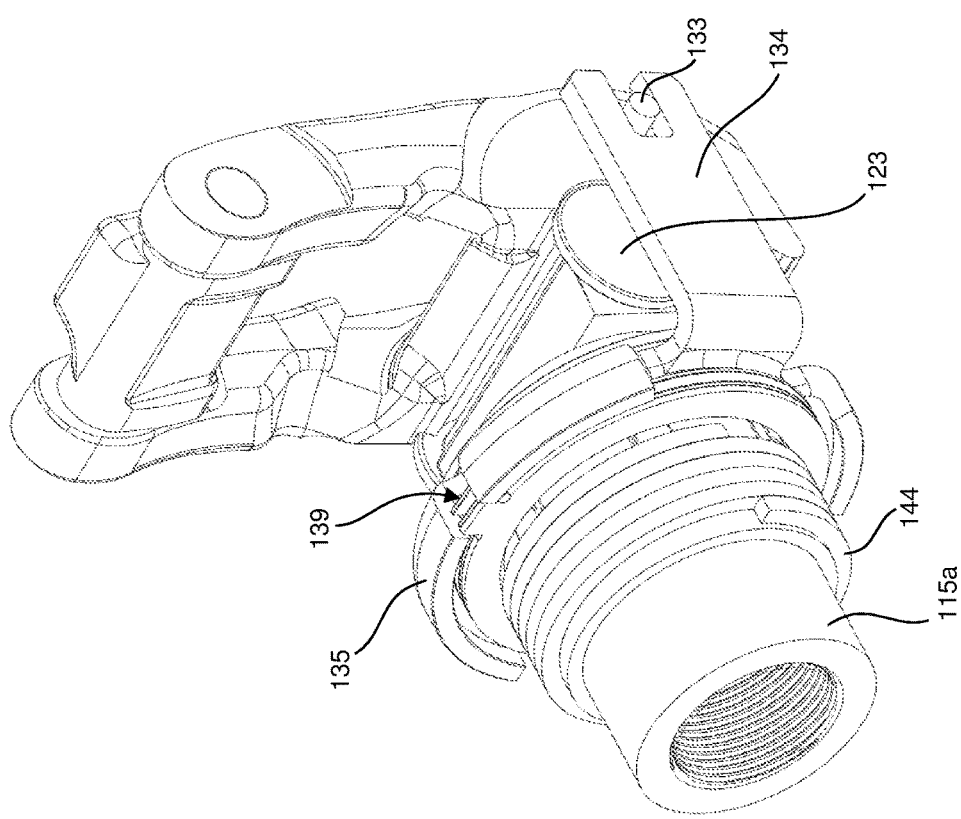
FIG. 20 is an isometric view of the assembled wear adjuster mechanism of FIG. 18.
Figure 21:
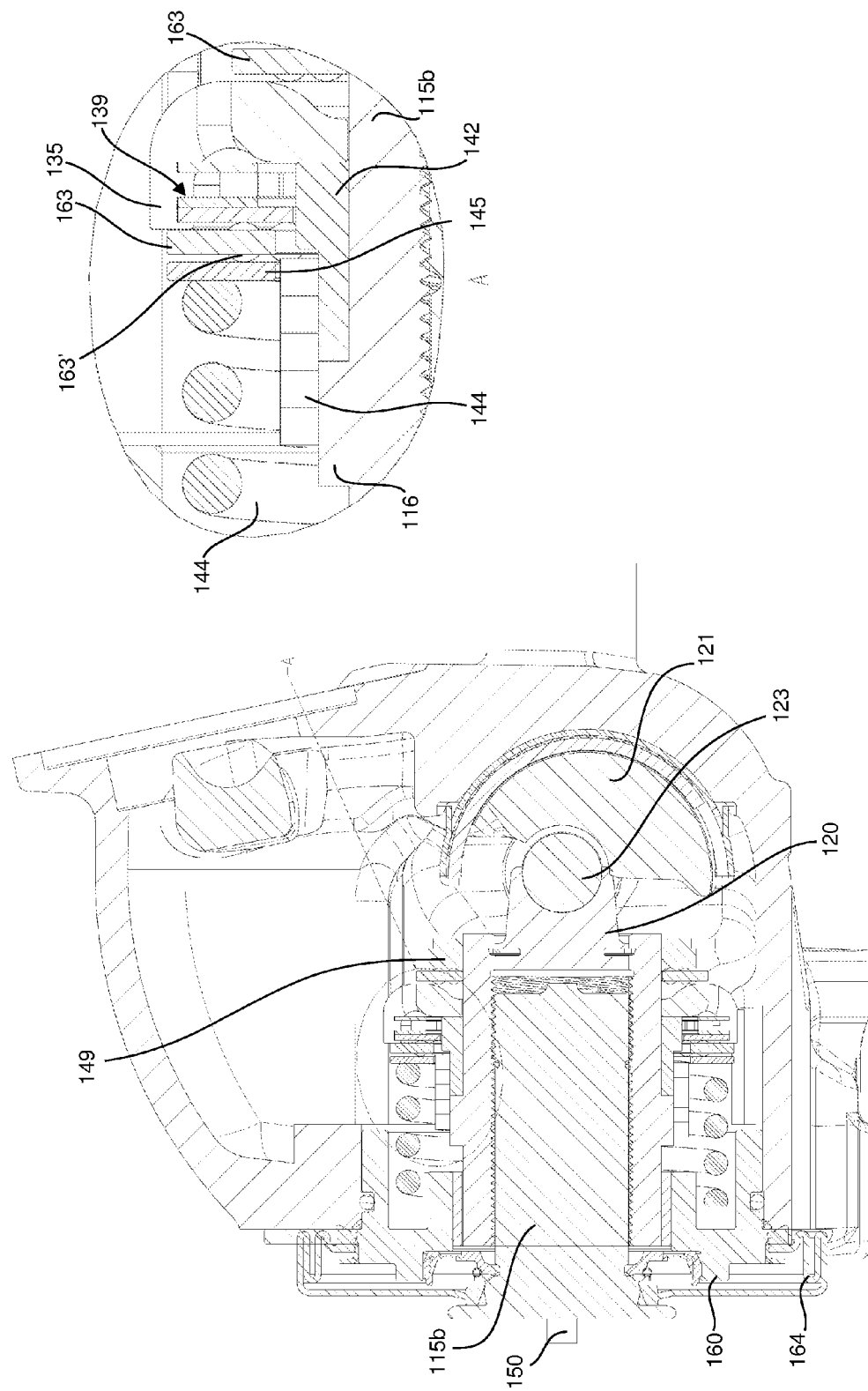
FIG. 21 is a side cross-sectional view through a portion of an assembled brake, which includes the wear adjuster mechanism of FIG. 18, on a radial inboard-outboard plane through a center line of the brake.

FIGS. 16 and 17 illustrate a variant of the pad retainer clip 86' which, in order to avoid the guide bars 95' has a pad spring section that is offset inboard from the forked sections to come into contact with an underside of the pad strap, as well as being bowed radially outwardly. However, in other embodiments the pad spring portion may no longer be connected to the forked sections 88', and may be positioned solely between the guide bars 95' to be resiliently loaded against the pad strap 92.

It will be appreciated that the spreader plate 12' may be guided on the pad strap 92 by use of other guide formations. For example, the pad strap may be formed with one or more longitudinal slots within it into which a suitable portion projecting from the spreader plate may fit, or the guide bars may be shaped so they at least partially encircle the pad strap, and the spreader plate is lifted out together with the pad strap. In other brakes, the backplate of a pad itself may be provided with a similar guiding arrangement, instead of a spreader plate.

It will be appreciated that numerous changes may be made within the scope of the present invention. For example, certain aspects of the invention may be applicable to other types of brake, such as twin piston or electromechanically actuated brakes (e.g., the brake pads and the carrier aspects).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A disc brake comprising:
    a caliper having a bridge portion arranged to extend over a rotor and a housing portion disposed inboard of the bridge portion and the rotor;
    a substantially cylindrical housing bore extending inboard from an outboard face of the housing portion;
    a substantially cylindrical separate guide insert having an inner guide bore and being mounted within the housing bore such that an inner surface of the housing bore limits transverse movement of the guide insert, wherein the housing bore and the guide insert have a constant diameter;
    a piston slideable within the inner guide bore relative to the guide insert so as to urge a brake pad towards the rotor and apply the disc brake; and
    an adjuster mechanism mounted in the housing bore of the housing portion, the adjuster mechanism including an operating shaft mounted inboard of the piston, the operating shaft being located within the housing bore;
    wherein the inner guide bore is dimensioned relative to the piston to restrain movement of the piston transverse to a longitudinal axis of the piston.

2. The disc brake of claim 1 further comprising a retaining insert configured to engage the guide insert to retain the guide insert within the housing bore in at least one axial direction.

3. The disc brake of claim 2 wherein the retaining insert is disposed adjacent to an outboard opening of the housing bore and projects from the outboard face of the housing portion, wherein at least a portion of the retaining insert is deformable over the guide insert to retain the guide insert within the housing bore.

4. The disc brake of claim 1 wherein the guide insert is retained within the housing bore by using a removable fastener to mount the guide insert within the housing bore.

5. The disc brake of claim 4 wherein the guide insert has a first circumferential recess in an external surface, the inner surface of the housing bore has a corresponding second circumferential recess, and the removable fastener is a circlip, snap ring or canted clip that engages the first and second circumferential recesses.

6. The disc brake of claim 1 wherein the guide insert has a radially extending external lip configured to engage the outboard face adjacent to the housing bore to limit axial movement of the guide insert inboard.

7. The disc brake of claim 1 further comprising a sealing element mounted proximate an outboard opening of the housing bore.

8. The disc brake of claim 1 wherein the disc brake is a single piston disc brake.

9. A disc brake comprising:
   a caliper having a bridge portion arranged to extend over a rotor and a housing portion disposed inboard of the bridge portion and the rotor;
   a housing bore extending inboard from an outboard face of the housing portion;
   a separate guide insert having an inner guide bore and being mounted within the housing bore such that an inner surface of the housing bore limits transverse movement of the guide insert;
   a retaining insert configured to engage the guide insert to retain the guide insert within the housing bore in at least one axial direction; and
   a piston slideable within the inner guide bore relative to the guide insert so as to urge a brake pad towards the rotor and apply the disc brake;
   wherein the inner guide bore is dimensioned relative to the piston to restrain movement of the piston transverse to a longitudinal axis of the piston.

10. The disc brake of claim 9 wherein the retaining insert is disposed adjacent to an outboard opening of the housing bore and projects from the outboard face of the housing portion, wherein at least a portion of the retaining insert is deformable over the guide insert to retain the guide insert within the housing bore.

11. The disc brake of claim 9 wherein the guide insert has a radially extending external lip configured to engage the outboard face adjacent to the housing bore to limit axial movement of the guide insert inboard.

12. The disc brake of claim 9 further comprising a sealing element mounted proximate an outboard opening of the housing bore.

13. A disc brake comprising:
   a caliper having a bridge portion arranged to extend over a rotor and a housing portion disposed inboard of the bridge portion and the rotor;
   a substantially cylindrical housing bore extending inboard from an outboard face of the housing portion;
   a substantially cylindrical separate guide insert having an inner guide bore and being mounted within the housing bore such that an inner surface of the housing bore limits transverse movement of the guide insert, wherein the housing bore and the guide insert have a constant diameter;
   a piston slideable within the inner guide bore relative to the guide insert so as to urge a brake pad towards the rotor and apply the disc brake; and
   an adjuster mechanism mounted in the housing bore of the housing portion, the adjuster mechanism including an operating shaft mounted inboard of the piston, the operating shaft being located within the housing bore;
   wherein the inner guide bore is dimensioned relative to the piston to restrain movement of the piston transverse to a longitudinal axis of the piston; and
   wherein the guide insert is retained within the housing bore by using a removable fastener to mount the guide insert within the housing bore.

\* \* \* \* \*